United States Patent
Taniel

(10) Patent No.: US 10,947,930 B2
(45) Date of Patent: Mar. 16, 2021

(54) EMULSIFYING SYSTEM AND EMULSIFYING METHOD

(71) Applicant: Roman Taniel, Pronstorf (DE)

(72) Inventor: Roman Taniel, Pronstorf (DE)

( * ) Notice: Subject to any disclaimer, the term of this patent is extended or adjusted under 35 U.S.C. 154(b) by 251 days.

(21) Appl. No.: 16/072,594

(22) PCT Filed: Jan. 17, 2017

(86) PCT No.: PCT/EP2017/025010
§ 371 (c)(1),
(2) Date: Jul. 25, 2018

(87) PCT Pub. No.: WO2017/129375
PCT Pub. Date: Aug. 3, 2017

(65) Prior Publication Data
US 2019/0040820 A1 Feb. 7, 2019

(30) Foreign Application Priority Data
Jan. 27, 2016 (DE) .................. 10 2016 000 761.3

(51) Int. Cl.
*F02M 25/022* (2006.01)
*F02M 43/04* (2006.01)
(Continued)

(52) U.S. Cl.
CPC ....... *F02M 25/0228* (2013.01); *B01F 3/0807* (2013.01); *B01F 3/0811* (2013.01);
(Continued)

(58) Field of Classification Search
CPC .... F02M 25/0228; F02M 25/03; F02M 43/04; B01F 3/0807; B01F 3/0811;
(Continued)

(56) References Cited

U.S. PATENT DOCUMENTS 1,804,413 A * 5/1931 Groff ...................... F02B 41/00
123/496
2,858,813 A * 11/1958 Haas .......................... F01P 3/16
239/132
(Continued)

FOREIGN PATENT DOCUMENTS

CH 364492 A 9/1962
DE 3928611 A1 3/1991
(Continued)

OTHER PUBLICATIONS

Bach, Florian, et al. "Einfluss von Diesel-EthanolWasser emulsionskraftstoffen auf die Dieselmotor-Emissionen [Influence of diesel-ethanol-water emulsion fuels on diesel engine emissions]" MTZ May 2011, pp. 408-414.
(Continued)

*Primary Examiner* — Hung Q Nguyen
(74) *Attorney, Agent, or Firm* — Jason H. Vick; Sheridan Ross, PC

(57) ABSTRACT

What is proposed is an emulsifying system for an internal combustion engine, wherein the emulsifying system comprises an emulsifying device for producing a water-fuel emulsion and an injector for injecting the water-fuel emulsion in a combustion chamber, the emulsifying device being arranged within the injector. Also proposed is an emulsifying method for preparing a water-fuel emulsion for an internal combustion engine, wherein fuel is pressurized in a fuel pressure accumulator and water is pressurized in a water pressure accumulator and fed separately to an injector for injecting the fuel and water into an associated combustion chamber, and/or fuel and water are emulsified by means of an emulsifying device that is integrated into an injector.

23 Claims, 8 Drawing Sheets

(51) Int. Cl.
*B01F 5/06* (2006.01)
*F02M 25/03* (2006.01)
*B01F 3/08* (2006.01)

(52) U.S. Cl.
CPC .......... *B01F 5/0671* (2013.01); *F02M 25/03* (2013.01); *F02M 43/04* (2013.01); *B01F 2003/0849* (2013.01); *B01F 2215/0088* (2013.01); *Y02T 10/12* (2013.01)

(58) Field of Classification Search
CPC ............ B01F 5/0671; B01F 2003/0849; B01F 2215/0088; Y02T 10/121
See application file for complete search history.

(56) References Cited

U.S. PATENT DOCUMENTS

| | | | | |
|---|---|---|---|---|
| 5,682,842 | A * | 11/1997 | Coleman | F02B 47/02 |
| | | | | 123/25 C |
| 6,142,107 | A | 11/2000 | Stutzenberger | |
| 6,223,699 | B1 * | 5/2001 | Donauer | F02M 43/04 |
| | | | | 123/25 C |
| 7,249,574 | B2 | 7/2007 | Verstallen | |
| 8,820,295 | B2 | 9/2014 | Coldren | |
| 8,875,666 | B2 | 11/2014 | Strey et al. | |
| 10,751,675 | B2 * | 8/2020 | Fumagalli | B01F 5/0608 |
| 2003/0066497 | A1 * | 4/2003 | Stanglmaier | F02M 57/02 |
| | | | | 123/25 F |
| 2006/0219735 | A1 | 10/2006 | Faye et al. | |
| 2008/0087017 | A1 * | 4/2008 | Van Nimwegen | F02M 53/06 |
| | | | | 60/599 |
| 2010/0281766 | A1 * | 11/2010 | Livshits | B01F 5/0659 |
| | | | | 44/458 |
| 2012/0102736 | A1 * | 5/2012 | Livshits | F02M 43/04 |
| | | | | 29/888.01 |
| 2013/0081593 | A1 * | 4/2013 | Coldren | F02M 63/0045 |
| | | | | 123/304 |
| 2013/0313339 | A1 * | 11/2013 | Carpenter | F02M 61/1833 |
| | | | | 239/548 |
| 2015/0369143 | A1 * | 12/2015 | Brown | F02F 1/242 |
| | | | | 123/470 |
| 2017/0320024 | A1 * | 11/2017 | Fumagalli | F23K 5/12 |

FOREIGN PATENT DOCUMENTS

| | | | | |
|---|---|---|---|---|
| DE | 4412965 | A1 | | 10/1995 |
| DE | 4435823 | C1 | | 12/1995 |
| DE | 19650559 | C1 | | 3/1998 |
| DE | 19706661 | A1 | | 8/1998 |
| DE | 19746491 | A1 | | 4/1999 |
| DE | 10251698 | A1 | | 6/2004 |
| DE | 102005044046 | B4 | | 1/2007 |
| DE | 102009048223 | A1 | | 6/2011 |
| DE | 102011076467 | A1 | | 11/2012 |
| DE | 112012004089 | T5 | | 9/2014 |
| EP | 0958853 | A1 * | 11/1999 | ............ B01F 5/0682 |
| EP | 2495051 | A1 | | 9/2012 |
| EP | 2650522 | A1 | | 10/2013 |
| FR | 2879675 | A1 * | 6/2006 | ......... F02M 63/0225 |
| GB | 2320060 | | | 6/1998 |
| GB | 2322411 | | | 8/1998 |
| KR | 20040074520 | A * | 8/2004 | ............ F02M 47/027 |

OTHER PUBLICATIONS

Pittermann, Roland et al., "Einfluss von Abgasrückführung und Kraftstoff-Wasser-Emulsion auf Verbrennungsablauf und Schadstoffbildung im Dieselmotor [Influence of exhaust gas recirculation and fuel-water emulsion on combustion process and pollutant formation in the diesel engine]. MTZ 60(1999)12, pp. 812-818".

International Search Report for International Application No. PCT/EP2017/025010, dated Apr. 18, 2017.

Written Opinion for International Application No. PCT/EP2017/025010, dated Apr. 18, 2017.

International Preliminary Report on Patentability for International Application No. PCT/EP2017/025010, dated Jul. 31, 2018.

* cited by examiner

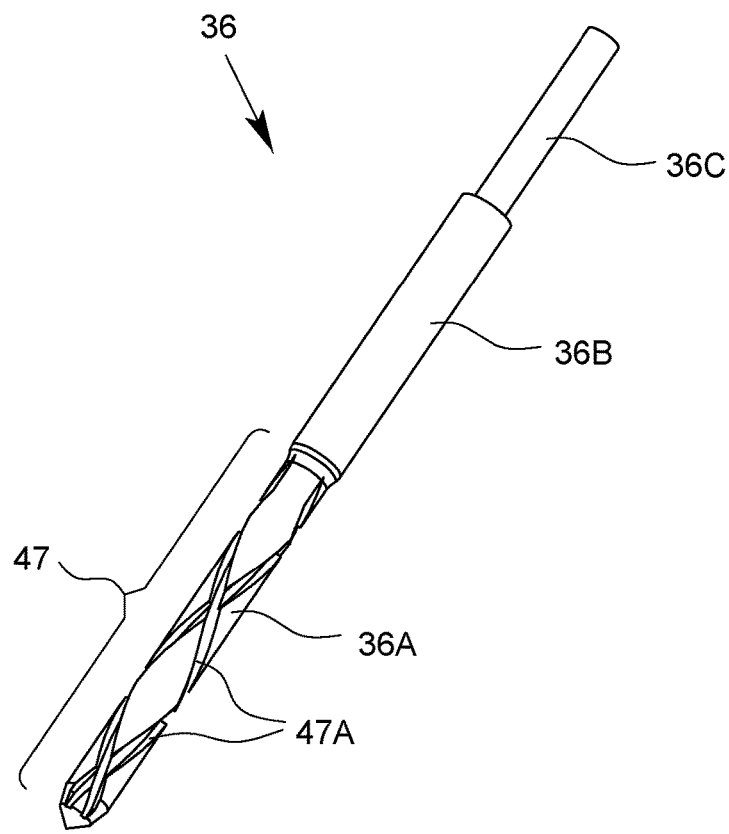
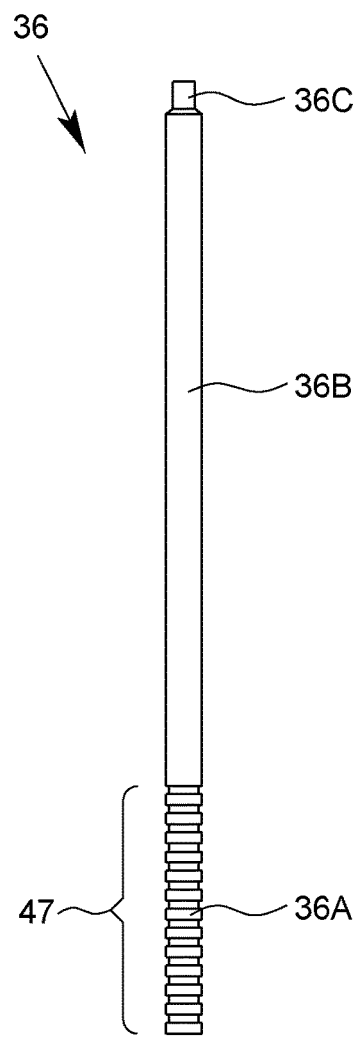
Fig. 7
Fig. 8

EMULSIFYING SYSTEM AND EMULSIFYING METHOD

CROSS REFERENCE TO RELATED APPLICATIONS

This application is a national stage application under 35 U.S.C. 371 of PCT Application No. PCT/EP2017/025010 having an international filing date of 17 Jan. 2017, which designated the United States, which PCT application claimed the benefit of German Application No. 10 2016 000 761.3, filed 27 Jan. 2016, each of which are incorporated herein by reference in their entirety.

The present invention relates to an emulsifying system according to the preamble of claim 1, an injection system according to the preamble of claim 19, and an emulsifying method according to the preamble of claim 20.

Diesel engine combustion is characterized in that a fuel or diesel that is capable of self-ignition is injected under very high pressure through an injection nozzle into a combustion-chamber bowl arranged in the piston. After the atomization and vaporization of the fuel in the combustion air, which has been heated to high temperatures by the compression, the fuel components that have already vaporized mix with the combustion air. This mixture formation is achieved both through the distribution of the fuel by means of 6- to 8-hole injection nozzles and by means of an air swirl generated in the inlet channels.

The chemical processing of the fuel-air mixture then takes place through cracking of the relatively long fuel molecules and the formation of active radicals. If the concentration of active radicals is sufficiently high, the auto-ignition of the fuel-air mixture begins in the form of a chain reaction.

The time required for the physical and chemical processes involved in the mixture formation is referred to as the ignition delay.

Owing to the direct injection of the fuel and the short time thus available for mixture formation, the further combustion takes place in a fuel-air mixture having a locally inhomogeneous fuel distribution. The ignition phase of this "inhomogeneous" fuel-air mixture is characterized by the occurrence of "ignition seeds" in areas of the mixture that are already ignitable.

As combustion continues, the fuel droplets that made their way into the hot, compressed combustion air at the beginning of the fuel injection react first, for which a relatively long time is thus available for mixture preparation. This combustion phase, which is also referred to as the combustion of "premixed" mixture, is characterized by higher combustion temperatures due to relatively rapid combustion reactions and thus increased thermal nitrogen oxide formation and diminished soot formation. During this first combustion phase, however, only a portion of the fuel-air mixture that is determined by the length of the ignition delay is burned.

The remainder of the required engine load-dependent mixture quantity, which is not yet ignitable at the beginning of combustion, is processed only over the further course of the combustion process as a result of sharply rising gas temperatures and an intense charge motion and is then burned in part with a deficiency of air at a relatively low combustion speed. This combustion phase, which is also referred to as "diffusion-controlled" combustion, is characterized by the initial formation of soot, which occurs in the event of local air deficiency, and subsequent, incomplete soot oxidation along with simultaneously diminished formation of nitrogen oxide (NOx).

The various phases of the combustion process and the corresponding mechanisms of pollutant formation result in an interrelationship between the nitrogen oxide and soot emissions that is typical of diesel engine combustion, also referred to as the NOx-particulate matter trade-off. This NOx-particulate matter interrelationship states that, when tuning the engine operating parameters, such as the injection timing, low NOx emissions are inevitably accompanied by an increase in soot/particulate emissions.

In order to comply with the legally prescribed pollutant emissions requirements for diesel engines, measures are taken both inside the engine and in the form of exhaust aftertreatment methods. Among the engine-internal measures, the most important measure for improving fuel-air mixture formation is the use of high-pressure injection systems, which allow for injection pressures of more than 200 MPa. The resulting improved disintegration of the injection jet into smaller fuel droplets leads to an improved mixing of the fuel with the combustion air and thus to fewer super-rich mixture zones and, accordingly, to substantially lower soot and particulate emissions.

Due to the higher combustion temperatures, mixture formation that has been intensified in this way results in commensurately higher NOx emissions, which should be avoided by increasing the air surplus through increased boost pressures and optimized injection flow rates.

Another measure is exhaust gas recirculation (EGR), which is also being increasingly used in heavy utility vehicle engines. However, the exhaust gas recirculation rate and thus also the possible reduction of NOx due to the decreasing oxygen content in the combustion air are limited by rising soot and particulate emissions.

Since the described measures that are taken inside of the engine for the purpose of reducing pollutants are not sufficient to bring exhaust emission to below the limits, so-called DeNOx catalyst systems with urea as a reducing agent and particulate filter systems known for their occasional use in passenger cars with diesel engines are being used in newly registered utility vehicle engines that must satisfy emissions classes Euro 5 and Euro 6.

In order to achieve the emissions targets, the raw emissions behavior of the diesel engine must be adapted to the exhaust aftertreatment systems used. For example, with typical Euro 5 diesel engines, particulate emissions are reduced to the corresponding limit values using flexibly tunable common rail (CR) injection systems at 160 to 180 MPa injection pressure, while nitrogen oxide emissions are usually sufficiently reduced through the use of a urea-based DeNOx system. NOx emissions are sometimes also reduced by a combination of exhaust gas recirculation and a downstream DeNOx system.

The economically justifiable process combination that is used depends essentially on the raw emissions of a diesel engine. For diesel engines of the Euro 6 emissions standard, the use of further optimized injection systems with injection pressures of 200 MPa and higher are required for further particulate emission reduction, along with the use of more efficient EGR-DeNOx system combinations. In particular, the use of EGR systems with significantly higher EGR rates and of DeNOx systems with NOx conversion rates of up to 90 percent is required.

If the NOx emissions limit values cannot be met by the described use of EGR and DeNOx systems, the additional use of a particulate filter system with appropriately adjusted EGR and DeNOx systems is unavoidable.

It can therefore be said that the Euro 5 emissions standard, and especially Euro 6, which are applicable to heavy utility vehicle engines, can only be achieved with substantial additional technical and economic outlay. For all combinations of processes for reducing NOx and particulate emissions, a deterioration of the fuel consumption behavior is to be expected due to the catalyst-induced increase in exhaust-gas backpressure and potentially required adaptations of the combustion process. As a matter of principle, however, raw NOx-particulate engine emissions that are as low as possible are aspired to, since that means lower expenditures on the exhaust aftertreatment side.

In principle, besides the use of engine-internal measures and exhaust aftertreatment systems, composition-modified fuels also represent an interesting way to reduce pollutant emissions in diesel engines. There has been longstanding interest particularly in the admixture of water and other components, such as alcohols, with diesel fuel, since the nitrogen oxide-soot trade-off can be favorably influenced in this way (cf. Bach, F., Lüft, M., Bartosch, S., Spicher, U.: Einfluss von Diesel-Ethanol-Wasser-Emulsionskraftstoffen auf die Dieselmotor-Emissionen [Influence of diesel-ethanol-water emulsion fuels on diesel engine emissions]. MTZ 05/2011, pp. 408-414).

When water-in-diesel fuel emulsion—or water-diesel emulsion, for short—is used, either a ready-to-use water-diesel emulsion using an emulsifying additive or an emulsion that is produced on board a vehicle by the existing injection system is injected into the combustion chamber instead of pure diesel fuel. The preparation of the emulsion in the vehicle offers the advantage that the proportion of water in the mixed fuel can be selected with a relatively high degree of freedom while taking combustion limits into account in order to achieve the greatest possible reduction in pollutants.

Water-diesel emulsions can be regarded as disperse multiphase systems of at least two mixture-insoluble liquids in which water is considered to be an internal, disperse phase.

Accordingly, the diesel fuel represents the external phase, the so-called dispersing agent.

Water-diesel emulsions are thermodynamically unstable and separate after a relatively short time. Through the use of emulsifying aids, so-called emulsifiers, it is possible in principle to convert a water-diesel emulsion into a thermodynamically stable form.

One important criterion for the suitability of an emulsion as fuel for diesel engines is the finest possible distribution of the water droplets in the diesel fuel.

For mobile use, emulsions produced in the vehicle using an emulsifier or, if no emulsifier is used, emulsions produced in a corresponding mixing device are suitable.

The use of emulsions produced outside of a vehicle, available at petrol stations, for example, have a constant composition that is not adapted to the requirements of the engine operation and thus does not enable the full potential for a reduction in emissions and consumption to be realized.

The effect of water-diesel emulsions consists, on the one hand, in a temperature reduction as a result of water vaporization and, on the other hand, in reduced combustion temperatures due to the increased inert gas component in the form of water vapor. Both lead to an extension of the physical ignition delay, which leads to a more uniform (more homogeneous) distribution of the fuel in the combustion chamber and thus to a larger proportion of the "premixed" combustion.

The resulting enhanced homogenization of the mixture in conjunction with the water droplets being finely distributed in the emulsion leads to a reduction of very fuel-rich and thus over-rich areas of the mixture, which are substantially responsible for soot formation during the combustion process.

The reduction in nitrogen oxide emissions can be attributed to a substantial reduction in flame temperature both due to the high enthalpy of vaporization of the water and due to the water-induced lower local specific heat release in the combustion zone (cf. Pittermann, R., Hinz, M., Kauert, L.: Einfluss von Abgasrückführung and Kraftstoff-Wasser-Emulsion auf Verbrennungsablauf and Schadstoffbildung im Dieselmotor [Influence of exhaust gas recirculation and fuel-water emulsion on the combustion process and pollutant formation in the diesel engine]. MTZ 60 (1999) 12, p. 812-818).

Exhaust gas recirculation (EGR), which is increasingly used to reduce NOx emissions, also results in reduced flame temperatures corresponding to the increased inert gas component. Greatly increased soot emissions occur at higher EGR rates, however, which can be avoided through combination with water-diesel emulsion fuels. The use of water-diesel emulsion fuels thus increases EGR tolerance and thus the potential for NOx and soot reduction.

Another prerequisite for the optimal use of an emulsion fuel is the need to adjust the water component in the emulsion to different engine operating conditions, shutdown, and engine startup even after extended downtime.

In the starting phase of the diesel engine, a safe and quick start and rapid heating of the engine can only be achieved through pure diesel fuel operation, since stable combustion is achieved after just a few cycles. Due to the degraded auto-ignitability of the emulsion, the use of a water-diesel emulsion also in the starting phase increases the number of combustionless cycles, resulting in a corresponding increase in emissions of unburned fuel. The water component in the emulsion can be increased during the warm-up phase in accordance with the heating of the engine.

Due to the higher combustion chamber temperatures during largely stationary engine operation and high output, a larger proportion of water may be contained in the emulsion in order to attain a level of combustion efficiency that is as optimal as possible with simultaneously high reduction of NOx and particulate emissions.

Under lower load conditions and correspondingly lower combustion chamber temperatures, a reduction of the water component in the emulsion is required in order to prevent too excessive cooling of the flame zones and the associated increased emissions of unburned fuel. Largely stationary engine operation with only relatively slow changes in load and engine speed does not require dynamic emulsifying equipment.

In principle, it is only possible to exploit the full potential of a water-diesel emulsion for NOx and soot reduction if the water component is maintained as close as possible to the respective technical combustion limit on an operating point-dependent basis. For the dynamic operation that is typical of the automotive sector, this means that very rapid adaptation of the water component to current combustion chamber temperatures and of the oxygen content available for combustion when using the exhaust gas recirculation is absolutely necessary.

The faster the adaptation of the water component to the current operating state of the engine, the greater the emissions reduction. This is becoming ever-more important, since the emissions performance of diesel engines for utility vehicles and mobile work machines is determined using transient exhaust gas test cycles.

DE 10 2009 048 223 A1 discloses a method for producing a microemulsion in which diesel fuel and water are separated by means of two common rail injection systems and fed under high pressure to a mixing chamber arranged between the high-pressure reservoirs for diesel and water and the injection nozzle. It is in this mixing chamber that a microemulsion is formed with the emulsifier already contained in the diesel fuel. This method requires the use of special emulsifiers that enable very fast water-diesel emulsification.

A device is known from DE 10 2005 044 046 B4 that feeds water and diesel fuel by means of a mechanically or hydraulically driven stepped piston at a pressure of up to 200 MPa to a counterflow high-pressure emulsifying nozzle. The water-diesel emulsion produced is held in several spring-loaded intermediate reservoirs, which also have a damper function, and conducted via a distribution pipe to the injectors as needed. In principle, this device therefore represents a combined emulsifying and high-pressure pump that is comparable to the diesel high-pressure pump of a conventional common rail injection system. The relatively large fuel reservoir volumes in the high-pressure pump and in the distribution line to the injectors do not permit quick adaptation of the emulsion composition within a few stroke cycles.

A method and a device for controlling the diesel fuel supply and water-diesel emulsion supply in in-line injection pumps is known from DE 44 12 965 A1 in which, depending on the load state of the engine, differently composed emulsions are generated in a mixing system and then fed to the injection pump, or there is exclusive diesel operation. The effect of this dead time between the emulsion formation and provision thereof at the injector on the operation behavior and emissions behavior depends substantially on the system volume in the area of emulsion production and the fuel volume to be exchanged in the high-pressure region of the injection system. In any case, adaptation to dynamic operating conditions is likely to be relatively slow.

It is the object of the present invention to provide an improved system and an improved method for producing a water-fuel emulsion, preferably wherein an energy-efficient production of a particularly homogeneous water-fuel emulsion of variable composition and/or with quicker adaptability to dynamic operating conditions is enabled or supported.

The above object is achieved by an emulsifying system according to claim 1, an injection system according to claim 19, or an emulsifying method according to claim 20. Advantageous developments constitute the subject matter of the subclaims.

The proposed emulsifying system preferably has an emulsifying device for producing a water-fuel emulsion and an injector or an injection nozzle for injecting the water-fuel emulsion into an associated combustion chamber of an internal combustion engine.

One aspect of the present invention is that the emulsifying device is—preferably completely—integrated into the injector or arranged within the injector. This enables or supports a particularly compact construction and quick adaptability to dynamic operating conditions. In particular, such a construction enables a minimization of the volume of the water-fuel emulsion remaining in the injection system and/or of the time until the introduction of the water-fuel emulsion that has been adapted or that has been optimized for the operating point.

The emulsifying system preferably has a fuel inlet and a water inlet that is separate from the fuel inlet, and/or fuel and water can preferably be supplied separately to the emulsifying system, particularly to the injector.

The emulsifying device is preferably arranged closer to an outlet for the water-fuel emulsion of the injector than to the fuel inlet, the water inlet, and/or an end of the injector opposite the outlet. Advantageously, the volume of the water-fuel emulsion remaining in the injector is thus reduced.

The emulsifying device preferably has a multi-stage, particularly two-stage, design. In particular, the emulsifying device has a pre-emulsifying stage and a fine emulsifying stage, in particular with both the pre-emulsifying stage and the fine emulsifying stage being arranged inside the injector.

The emulsifying device preferably has or forms a static mixer for mixing the fuel with water.

Especially preferably, the pre-emulsifying stage and/or the fine emulsifying stage is/are static or at least substantially immobile, and/or the emulsifying device has no moving components. This enables a compact, low-maintenance, stable, and cost-effective construction of the emulsifying system.

The emulsifying device, particularly the mixer and/or the pre-emulsifying stage, is preferably embodied so as to feed water to the fuel laterally or transversely to the main direction of flow of the fuel. This is conducive to efficient mixing.

The term "emulsion" is preferably to be understood as meaning a mixture of at least two fluids. Preferably, an emulsion comprises a first fluid, such as fuel, as the internal phase and a second fluid, such as water, as the external phase. A water-fuel emulsion in terms of the present invention is therefore a mixture of water and fuel, such as diesel or gasoline, particularly wherein the average droplet size or the average droplet diameter of the water droplets is less than 10 µm, especially preferably less than 5 µm, particularly less than 1 µm. However, a water-fuel emulsion may also consist of other fluids and/or contain other fluids or substances, for example an emulsifier. In particular, an alcohol may be used in addition to or as an alternative to water.

The term "injection nozzle" or "injector" is preferably to be understood as a device that is designed to distribute or atomize or nebulize fuel or a water-fuel emulsion or to form an aerosol with the water-fuel emulsion in this or another manner and/or guide it into an associated combustion chamber.

An injection nozzle or an injector according to the present invention preferably has a fluid connection for fuel or a water-fuel emulsion, an electrical connection to a control device, a compression spring, and/or a nozzle body, and/or a nozzle needle. Optionally, an injection nozzle has a preferably electric (piezoelectric) actuator for actuating the nozzle needle. Preferably, the nozzle needle can be opened as a function of the fuel or emulsion pressure, preferably such that the fuel or the emulsion is injected into a combustion chamber.

The terms "injection nozzle" and "injector" are preferably synonyms and are used interchangeably herein. In particular, the term "injection nozzle" can be replaced by the term "injector," or vice versa.

Especially preferably, the emulsifying device and the injection nozzle or injector together form an at least substantially fixed and/or rigid and/or integrally formed assembly or structural unit. In this way, the distance between the emulsifying device and the injection nozzle is minimized, thereby reducing any flow losses, enabling dynamic adaptation of the water-fuel ratio, and/or counteracting segregation of the emulsion. Furthermore, by virtue of the compact construction or the smaller volume of the emulsifying system of preferably less than 20 ml, particularly less than 10 ml, the amount of fuel required for flushing the emulsifying system can be reduced, or flushing of the emulsifying system can be dispensed with.

In the proposed emulsifying method for producing a water-fuel emulsion, water and fuel are fed—preferably separately from one another and/or under pressure—to an injector in order to produce the water-fuel emulsion. Corresponding advantages are achieved in this way.

According to another aspect of the present invention that can also be realized independently, fuel and water are emulsified by means of a—preferably static—emulsifying device that is integrated into an injector, preferably such that a water-fuel emulsion is produced within the injector and/or near the combustion chamber. Corresponding advantages are achieved in this way.

In principle, the abovementioned aspects and features of the present invention as well as the aspects and features of the present invention that follow from the claims and the following description can be implemented independently of one another, but also in any desired combination or order.

Other aspects, advantages, features, and characteristics of the present invention follow from the claims and the following description of preferred embodiments with reference to the drawing. In the drawings, FIG. 1 shows a schematic representation of a proposed internal combustion engine with a proposed injection system according to a first embodiment;

FIG. 7 shows a perspective view of a nozzle needle of the emulsifying system according to FIG. 6;

FIG. 8 shows a perspective view of a nozzle needle according to a further embodiment;

In the partially not-to-scale, merely schematic figures, the same reference symbols are used for same, congeneric, or similar components, with it being possible for corresponding or comparable characteristics and advantages to be achieved even if a repeated description is omitted.

FIG. 1 shows a schematic representation of a proposed internal combustion engine 1 with the proposed injection system 2.

The internal combustion engine 1 and/or injection system 2 preferably has at least one emulsifying system 3 and at least one combustion chamber B.

The injection system 2 and/or emulsifying system 3 is preferably designed to inject fuel and/or water or a water-fuel emulsion into one or more combustion chambers B of the internal combustion engine 1, preferably under pressure, particularly at greater than 50 MPa or 100 MPa.

The emulsifying system 3 is preferably designed to mix or emulsify water and fuel, particularly diesel or gasoline, and/or to create or produce a water-fuel emulsion or water-diesel emulsion, from water and fuel, particularly diesel or gasoline. In principle, however, other fluids can also be emulsified with one another by means of the emulsifying system 3.

Figure 1:
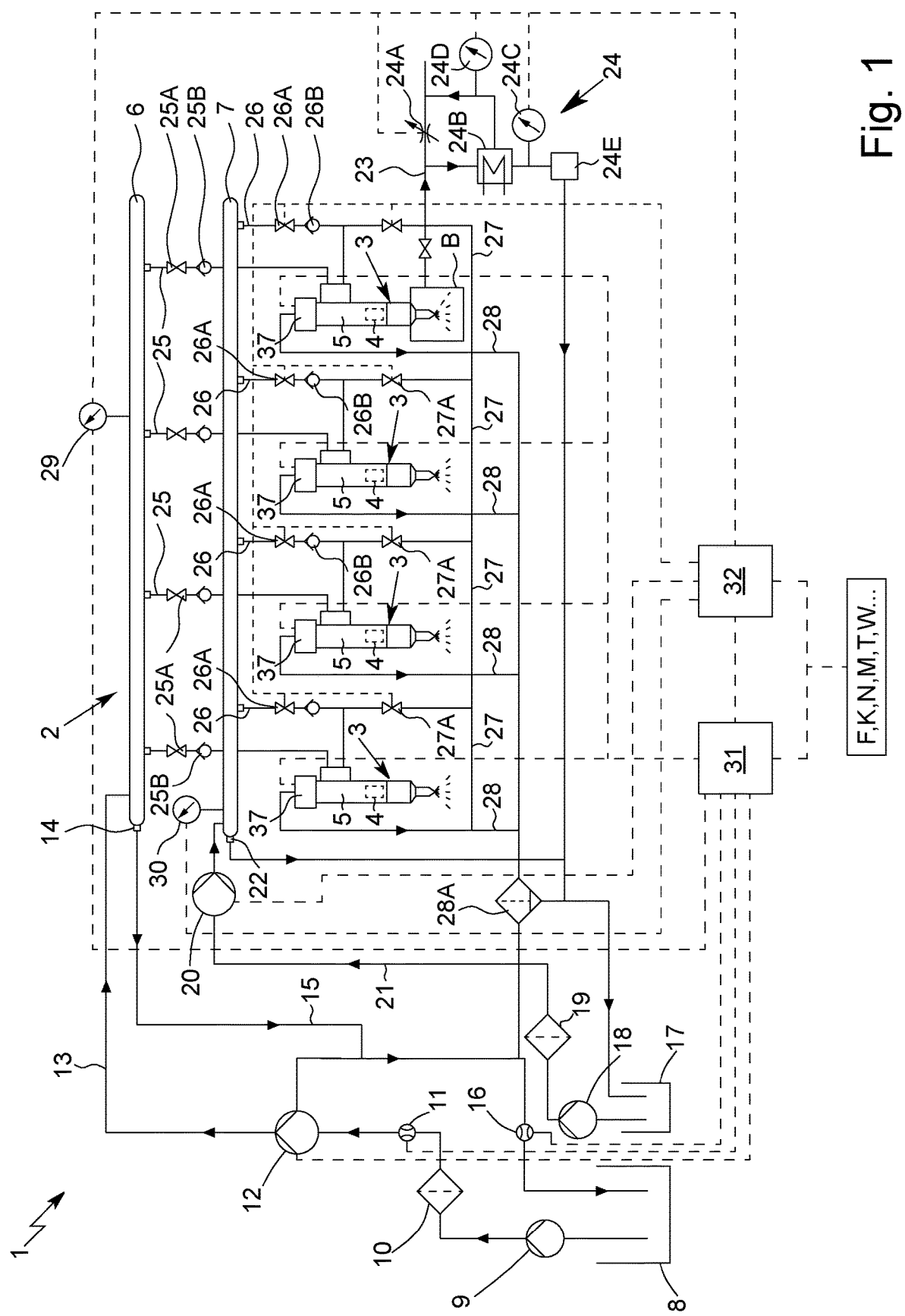

In the depicted embodiment, the internal combustion engine 1 or injection system 2 has a plurality of—in this case four—emulsifying systems 3, preferably with each emulsifying system 3 being associated or associable with one cylinder and/or combustion chamber B of the internal combustion engine 1 and/or being fluidly connected or connectable to one cylinder or combustion chamber B of the internal combustion engine 1. In FIG. 1, however, only one combustion chamber B is indicated.

The internal combustion engine 1 and/or injection system 2 and/or emulsifying system 3 preferably has an emulsifying device 4 and/or an injection nozzle or injector 5.

The internal combustion engine 1 and/or injection system 2 preferably has a fuel pressure accumulator or fuel rail or common rail 6 and/or a water pressure accumulator or water rail 7, preferably wherein a plurality of emulsifying systems 3, emulsifying devices 4, and/or injectors 5—preferably each individually—are or can be fluidly connected to the fuel pressure accumulator 6 and/or water pressure accumulator 7, preferably each via a corresponding high-pressure line or injection line, as will be explained in greater detail below.

In the following, the schematic structure of the internal combustion engine 1 and the injection system 2 will first be described with reference to FIG. 1 before the proposed emulsifying system 3 and emulsifying device 4 and injector 5 are explained in greater detail.

The internal combustion engine 1 and/or injection system 2 preferably has a fuel tank 8, a fuel precompression pump 9, a fuel filter 10, a fuel meter 11, particularly a fuel volume meter, and/or a high-pressure fuel pump 12, preferably on a (common) fuel supply line 13.

Preferably, the internal combustion engine 1 and/or injection system 2, in particular the high-pressure fuel pump 12 and/or the fuel pressure accumulator 6, has/have a fuel pressure control valve 14 and/or a fuel return line 15, with the fuel pressure K in the fuel pressure accumulator 6 being preferably feedback-controllable or controllable, particularly reducible, by means of the fuel pressure control valve 14.

The fuel return line 15 preferably connects the fuel pressure accumulator 6, the fuel precompression pump 9, and/or the high-pressure fuel pump 12 to the fuel tank 8, the fuel return line 15 preferably having a (an additional) fuel meter 16.

Preferably, the injection system 2 and/or emulsifying system 3 and/or emulsifying device 4 is fluidly connected via the fuel supply line 13 to the fuel tank 8.

In particular, the emulsifying system 3 and/or emulsifying device 4 and/or injector 5 can be supplied with fuel, particularly diesel or gasoline, and another component—water, in this case—preferably in order to produce a water-fuel emulsion.

The internal combustion engine 1 and/or injection system 2 preferably has a water tank 17, a water precompression pump 18, a water filter 19, and/or a high-pressure water pump or metering unit 20, preferably on a (common) water supply line 21.

Preferably, the emulsifying system 3 and/or emulsifying device 4 is connected via the water supply line 21 to the water tank 17 and/or can be supplied with water.

Preferably, the internal combustion engine 1 and/or injection system 2, particularly the high-pressure water pump 20 and/or the water pressure accumulator 7, has/have a water pressure control valve 22, the water pressure Win the water pressure accumulator 7 being preferably feedback-controllable or controllable, particularly reducible, by means of the water pressure control valve 22.

Preferably, the internal combustion engine 1 has an exhaust pipe 23, it being preferably possible for exhaust gas to be discharged via the exhaust pipe 23 to the surroundings and/or to an optional exhaust gas treatment.

Preferably, the exhaust pipe 23 is connected to the combustion chambers B and/or exhaust gas can be discharged from the combustion chambers B via the exhaust pipe 23, particularly via one or more associated valves (not shown).

Optionally, the internal combustion engine 1 has a closed or closable water circuit and/or water is at least partially recoverable from the exhaust gas.

Preferably, the internal combustion engine 1 has a recovery system 24, the recovery system 24 being preferably designed to recover or separate water—at least partially—from the exhaust gas, to treat it, and/or to feed it to the water tank 17.

In particular, the recovery system 24 is designed to separate water from the exhaust gas, to filter and/or neutralize it and/or to adjust the pH value of the water.

The recovery system 24 is preferably connected to and/or integrated into the exhaust pipe 23.

Preferably, the recovery system 24 connects the exhaust pipe 23 to the water tank 17.

Preferably, the recovery system 24 has a particularly controllable throttle 24A, a particularly controllable radiator 24B, a pressure sensor 24C, a humidity sensor 24D, and/or a water treatment unit 24E.

Preferably, the exhaust gas from the exhaust pipe 23 can be at least temporarily and/or partially fed to the recovery system 24, particularly to the radiator 24B and/or to the treatment unit 24E, preferably through closing or actuating of the throttle 24A.

Preferably, the exhaust gas can be cooled by means of the recovery system 24, particularly by means of the radiator 24B, preferably such that water in the exhaust gas condenses at least partially. In particular, water or the condensate from the exhaust gas can be discharged in the radiator 24B.

Preferably, the pressure of the exhaust gas or condensate and/or the humidity of the exhaust gas can be measured by means of the pressure sensor 24C or humidity sensor 24D.

Preferably, the condensate or separated water can be filtered by means of the treatment unit 24E and/or the pH of the condensate or separated water can be adapted or adjusted by means of the treatment unit 24E, preferably to a value of greater than 2, particularly greater than 3 or 5, and/or less than 12 or 10, particularly less than 9 or 8.

The internal combustion engine 1 and/or injection system 2 preferably has a high-pressure line or injection line for fuel or a fuel line 25, the fuel line 25 preferably fluidly connecting the fuel pressure accumulator 6 to the emulsifying device 4 and/or injector 5.

Optionally, a control valve 25A and/or check valve 25B is arranged in the fuel line 25, the fuel supply to the emulsifying device 4 and/or injector 5, particularly the fuel quantity, being preferably controllable by means of the control valve 25A.

Preferably, the check valve 25B is designed to prevent backflow of the fuel and/or water from the emulsifying device 4 and/or injector 5 to the fuel pressure accumulator 6.

Preferably, the internal combustion engine 1 and/or injection system 2 has a high-pressure line or injection line for water or a water line 26, the water line 26 preferably fluidly connecting the water pressure accumulator 7 to the emulsifying device 4 and/or the injector 5.

Preferably, a control valve 26A and/or check valve 26B is arranged in the water line 26, the water supply to the emulsifying device 4 and/or injector 5, particularly the water quantity, the timing of the water supply, and/or the duration of the water supply, being preferably controllable by means of the control valve 26A.

Preferably, the check valve 26B is designed to prevent backflow of fuel and/or water from the emulsifying device 4 and/or from the injector 5 to the water pressure accumulator 7.

Optionally, the internal combustion engine 1 and/or injection system 2 has a flush line 27, the flush line 27 preferably fluidly connecting the water line 26 to a return line 28 and/or fluidly connecting the fuel pressure accumulator 6 and/or the fuel line 25 to the water line 26.

Preferably, the water line 26 and/or the emulsifying device 4 and/or the injector 5 can be flushed at least partially with fuel by means of the flush line 27, preferably such that residues of the water-fuel emulsion can be removed at least partially from the fuel line 25 and/or emulsifying device 4 and/or the injector 5.

Preferably, as shown in FIG. 1, the flush line 27 leads into the water line 26, particular downstream from the check valve 26B.

Preferably, a control valve 27A and/or a check valve (not shown) is arranged in the flush line 27, the flush operation being preferably controllable by means of the control valve 27A, and/or the check valve being designed to prevent fuel and/or water from flowing back into the fuel pressure accumulator 6.

Preferably, the internal combustion engine 1 and/or injection system 2 has a return line 28, the return line 28 preferably fluidly connecting the emulsifying system 3, emulsifying device 4 and/or injector 5 to the fuel tank 8 and/or water tank 17, and/or water and/or or fuel can flow back through the return line 28 into the fuel tank 8 or water tank 17.

Preferably, it is possible by means of the return line 28 to discharge fuel and/or water, that is used to control the injector 5, from the injector 5.

Optionally, a water separator and/or fuel separator 28A is connected to or integrated into the return line 28, and/or the return line 28 connects the emulsifying system 3, emulsifying device 4 and/or injector 5 to a water and/or fuel separator 28A.

The water and/or fuel separator 28A is preferably designed to separate fuel and water from one another and/or to separate off water or fuel.

Preferably, the fuel separated by means of the water separator 28A can be fed to the fuel return line 15 and/or fuel tank 8, and/or the water separated by means of the water separator 28A can be fed to the water tank 17 via a corresponding water return line.

Preferably, the internal combustion engine 1 and/or injection system 2 has at least one pressure sensor 29, 30 and/or at least one pressure sensor 29, 30 is integrated into the fuel supply line 13, water supply line 21, fuel pressure accumulator 6, and/or water pressure accumulator 7, preferably for the purpose of measuring the fuel pressure K and/or the water pressure W.

Preferably, the internal combustion engine 1 and/or injection system 2 has a fuel pressure sensor 29 and a water pressure sensor 30, in particular wherein the fuel pressure sensor 29 is arranged in the fuel pressure accumulator 26 or connected thereto and/or is designed to measure the fuel pressure K in the fuel pressure accumulator 6.

Preferably, the water pressure sensor 30 is arranged in the water pressure accumulator 7 or connected thereto and/or designed to measure the water pressure W in the water pressure accumulator 7.

Preferably, the internal combustion engine 1 and/or injection system 2 has a first control unit 31, the first control unit 31 being preferably designed to control or feedback control the fuel injection and/or fuel supply to the fuel pressure accumulator 6 and/or injector 5 and/or combustion chamber B, particularly the fuel quantity, the fuel pressure K, the timing of the fuel injection, and/or the duration of the fuel injection, preferably as a function of at least one operating parameter and/or one engine mode, especially preferably as a function of the engine load M, engine speed N, cooling-water temperature T, accelerator pedal position F, the fuel pressure K in the fuel pressure accumulator 6, and/or other parameters.

Especially preferably, the first control unit 31 is designed to determine or calculate the necessary or optimal injection quantity and/or injection duration and/or the necessary or optimal injection timing and/or injection pressure of the fuel, preferably as a function of at least one operating parameter.

In particular, the first control unit 31 is designed to control the injector 5, the fuel precompression pump 9, the high-pressure fuel pump 12, the fuel pressure control valve 14, and/or the control valve 25A in the fuel line 25.

Preferably, the internal combustion engine 1 and/or injection system 2 has a second control unit 32, the second control unit 32 being preferably designed to control or feedback control the water injection and/or water supply into the water pressure accumulator 7 and/or injector 5 and/or combustion chamber B, particularly the water quantity, the water pressure W, the timing of water supply and/or the duration of water supply, and/or the composition of the water-fuel emulsion or the water content in the water-fuel emulsion, preferably as a function of at least one operating parameter and/or one engine mode, especially preferably as a function of the engine load M, engine speed N, cooling-water temperature T, accelerator pedal position F, the fuel pressure K, the water pressure W, and/or other parameters.

Preferably, the second control unit 32 is designed to determine or calculate the necessary or optimal injection quantity and/or injection duration and/or the necessary or optimal injection timing and/or injection pressure of water into the water pressure accumulator 7 and/or injector 5 and/or combustion chamber B and/or to control the emulsifying system 3, the injector 5, the water precompression pump 18, high-pressure water pump 20, the control valve 26A in the water line 26, the control valve 27A in the flush line 27, the recovery system 24, particularly the throttle 24A and/or the radiator 24B, and/or the water pressure control valve 22 at the water pressure accumulator 7, preferably as a function of at least one operating parameter and/or one engine mode, particularly as a function of the engine load M, engine speed N, cooling-water temperature T, accelerator pedal position F, the fuel pressure K, the water pressure W, and/or other parameters.

Preferably, the water content of the water-fuel emulsion can be changed, varied and/or adapted as a function of at least one operating parameter and/or the engine operating point, preferably by means of the second control unit 32.

Most preferably, the second control unit 32 is designed to adjust the water pressure W in the water pressure accumulator 7 as a function of the fuel pressure K in the fuel pressure accumulator 6 and/or to adjust it to the fuel pressure K, and/or to hold the difference between the water pressure W and the fuel pressure K at least substantially constant and/or to compensate for and/or minimize variations in the pressure difference between the water pressure W and the fuel pressure K, preferably by controlling the high-pressure water pump 20 and/or the water pressure control valve 22.

In the depicted embodiment, the proposed internal combustion engine 1 and/or injection system 2 has two control units 31, 32. However, constructive solutions are also possible in which the internal combustion engine 1 and/or injection system 2 has only one control unit 31 or 32 and/or in which one of the control units 31 or 32 has one, several, or all of the features of the other control unit 31 or 32. In particular, the first control unit 31 can essentially have the same design as the second control unit 32, or vice versa.

Preferably, the first control unit 31 and/or the second control unit 32 is or can be electrically connected to the injection system 2, the emulsifying system 3, the emulsifying device 4, the injector 5, the fuel precompression pump 9, the fuel meter 11 in the fuel supply line 13, the high-pressure fuel pump 12, the fuel pressure control valve 14, the fuel meter 16 in the fuel return line 15, the water precompression pump 18, the high-pressure water pump 20, the water pressure control valve 22, the recovery system 24, the control valve 25A in the fuel line 25, the control valve 26A in the water line 26, the control valve 27A in the flush line 27, the fuel pressure sensor 29, and/or the water pressure sensor 30.

Optionally, the first control unit 31 is connected to the second control unit 32 and/or integrated therein, or vice versa.

Using dashed lines, FIG. 1 shows the corresponding preferred and/or optional signal connections, control lines, or the like of the first control unit 31 and second control unit 32 with the corresponding components.

As already explained at the outset, the internal combustion engine 1 and/or injection system 2 preferably has a plurality of emulsifying systems 3, emulsifying devices 4 and/or injectors 5.

Preferably, the emulsifying systems 3, emulsifying devices 4 and/or injectors 5 are connected in parallel to the fuel supply line 13, the fuel pressure accumulator 6, the water pressure accumulator 7 and/or the water supply line 21, and/or are or can be supplied in parallel with fuel and/or water.

In the depicted embodiment, each cylinder and/or injector 5 is preferably associated with a separate or its own emulsifying device 4.

Figure 2:
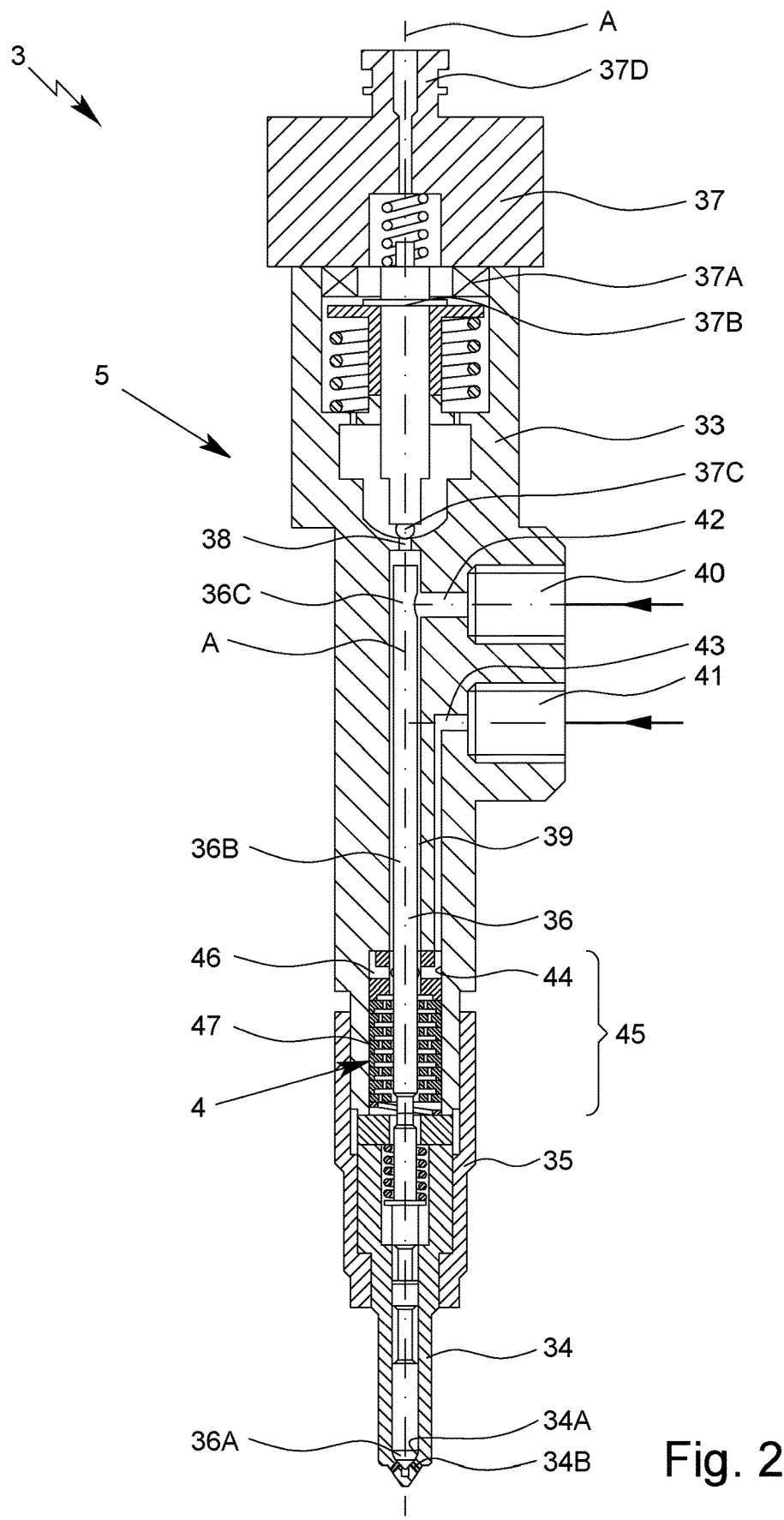
FIG. 2 shows a schematic section of a proposed emulsifying system with a proposed emulsifying device.

FIG. 2 shows a schematic longitudinal section of the proposed emulsifying system 3 with the proposed emulsifying device 4 and the proposed injector 5.

The emulsifying system 3 and/or injector 5 preferably has a nozzle body or valve body 33 and a nozzle head or valve head 34, the nozzle head 34 being preferably connected or connectable in a form-fitting, force-fitting, and/or bonded manner to the nozzle body 33, here by means of a cap nut 35.

The nozzle head 34 is preferably arranged on a side of the emulsifying system 3 or injector 5 that faces toward the combustion chamber B (not shown in FIG. 2). Especially preferably, the emulsifying system 3, particularly the injector 5 and/or the nozzle head 34, projects at least partially into the associated combustion chamber B in the installed state.

In particular, the nozzle head 34 is embodied as an outlet for the fuel or the water-fuel emulsion and/or is designed to conduct the fuel or the water-fuel emulsion to the associated combustion chamber B.

The emulsifying system 3 and/or injector 5 preferably has a movable nozzle element or movable nozzle needle 36, the nozzle needle 36 being preferably movable axially and/or along a longitudinal axis A of the emulsifying system 3 and/or injector 5, preferably in order to inject fuel or the water-fuel emulsion into the combustion chamber B or to interrupt the process of injection into the combustion chamber B.

In particular, the emulsifying system 3 and/or injector 5 can be opened and/or closed and/or fuel and/or water or the water-fuel emulsion can be injected into the combustion chamber B by a lifting movement of the nozzle needle 36.

The nozzle element or nozzle needle 36 is preferably elongated and/or needle-shaped. Other solutions are also possible here, however.

Preferably, the nozzle needle 36 forms a preassembled unit and/or the nozzle needle 36 is embodied as a single piece.

The nozzle needle 36 preferably has a nozzle needle tip 36A, a middle part 36B and/or a control piston 36C, the middle part 36B preferably connecting the nozzle needle tip 36A to the control piston 36C.

The emulsifying system 3 or injector 5, particularly the nozzle head 34, preferably has a valve seat 34A, particularly for the nozzle needle 36, especially preferably for the nozzle needle tip 36A, and/or at least one injection or outlet channel 34B, it being preferably possible for fuel and/or water, particularly fuel and water together or the water-fuel emulsion produced in the emulsifying device 4, to be fed via the outlet channel 34B to the combustion chamber B.

Preferably, the nozzle needle 36 extends through the emulsifying device 4, particularly to the outlet of the injector 5 and/or valve seat 34A.

In the illustrated state, the emulsifying system 3 or injector 5 is closed and/or the nozzle needle 36, particularly the nozzle needle tip 36A, is pressed against the nozzle head 34, particularly the valve seat 34A, preferably such that the outlet channel 34B is closed.

The emulsifying system 3 preferably has a control device 37, the control device 37 being preferably designed to actuate or axially move the injector 5 or the nozzle needle 36, particularly the control piston 36C, preferably in a contactless manner, particularly by hydraulic or mechanical means.

In the depicted embodiment, the injector 5 and/or the nozzle needle 36 can preferably be operated hydraulically, particularly by means of the fuel pressure K.

The control device 37 is especially preferably embodied as a particularly piezoelectric or electromagnetic actuator or has such an actuator. Other solutions are also possible here, however.

Preferably, the control device 37 is electrically connected to the first control unit 31 and/or second control unit 32 and/or can be controlled by the first control unit 31 and/or second control unit 32.

The control device 37 is preferably arranged on a side facing away from the combustion chamber B or at an axial end of the injector 5 or nozzle body 33 facing away from the combustion chamber B and/or attached thereto.

The control device 37 preferably has an (electric) control terminal (not shown), a, for example, electromagnetic or piezoelectric actuator, here with an electromagnet 37A and an armature 37B, a control valve 37C, a return passage or return passage connecting piece 37D and/or a control channel 38.

Preferably, the control channel 38 can be selectively opened or closed by means of the actuator, especially preferably in order to selectively reduce or increase the (axial) pressure on the nozzle needle 36 and/or control piston 36C and/or to move the nozzle needle 36 in the nozzle body 33 and/or to selectively open or close the outlet channel 34B.

In particular, the actuator is designed to enable or prevent fuel flow through the control channel 38 to the return passage 37D, in particular to actuate the injector 5 or to initiate or end an injection process.

The return passage 37D is preferably fluidly connected or connectable to the fuel tank 8, the fuel return line 15 and/or the water tank 17, as already explained above.

The emulsifying system 3 or injector 5 preferably has a longitudinal bore or a preferably elongated pressure chamber 39 that is particularly formed by a plurality of bore sections having different diameters, the nozzle needle 36 being preferably arranged or—at least partially—guided in the pressure chamber 39 and/or—at least partially—flowed around.

Preferably, the pressure chamber 39 is designed to direct fuel, water and/or the water-fuel emulsion to the outlet or nozzle head 34 or outlet channel 34B.

Preferably, the emulsifying system 3 or the injector 5 can be flowed through at least substantially axially, preferably by fuel and/or water. In particular, the main direction of flow of the fuel and/or the water in the emulsifying system 3 or injector 5, particularly in the pressure chamber 39, extends at least substantially axially and/or along the longitudinal axis A of the injector 5.

The emulsifying system 3 and/or injector 5 preferably has an inlet. Especially preferably, the emulsifying system 3 and/or injector 5 has a fuel inlet 40 and a water inlet 41, preferably wherein fuel can be fed via the fuel inlet 40 and/or water can be fed via the water inlet 41 to the emulsifying system 3, emulsifying device 4 and/or injector 5, particularly separately from one another. However, constructive solutions are also possible in which the emulsifying system 3 or emulsifying device 4 or injector 5 has a common inlet for fuel and water, and/or in which water and fuel can be fed together via a common inlet to the emulsifying system 3, emulsifying device 4 and/or injector 5.

The emulsifying system 3 or injector 5 preferably has a fuel inlet channel 42 and a water inlet channel 43.

Preferably, the fuel inlet 40 is fluidly connected via the fuel inlet channel 42 to the pressure chamber 39. In particular, fuel can be supplied to the pressure chamber 39 via the fuel inlet 40 and/or the fuel inlet channel 42.

Preferably, the water inlet 41 is fluidly connected via the water inlet channel 43 to the pressure chamber 39 and/or the emulsifying device 4. In particular, water can be supplied to the pressure chamber 39 and/or the emulsifying device 4 via the water inlet 41 and/or water inlet channel 43.

In the depicted embodiment, the fuel inlet 40 and the water inlet 41 are preferably arranged laterally on the injector 5 or nozzle body 33. Other solutions are also possible here, however.

Preferably, the emulsifying device 4 and the injector 5 together form a fixed or rigid assembly or structural unit.

In particular, the emulsifying device 4 is integrated into the injector 5 and/or at least partially arranged within the injector 5 or formed by the injector 5.

In the depicted embodiment, the emulsifying device 4 is completely arranged within or surrounded by the injector 5 and/or nozzle body 33.

Preferably, the emulsifying device 4 is connected in a form-fitting, force-fitting, and/or bonded manner to the injector 5, particularly to the nozzle body 33.

Preferably, the injector 5 and/or nozzle body 33 has a receptacle 44 for receiving the emulsifying device 4. The emulsifying device 4 is especially preferably inserted or screwed into the injector 5 and/or nozzle body 33, particularly into the receptacle 44.

In the depicted embodiment, the emulsifying device 4 is preferably embodied as a component that is separate from the injector 5 or that can be removed from the injector 5. However, constructive solutions are also possible in which the emulsifying device 4 and the injector 5 are integrally formed.

In an especially preferred variant, the emulsifying device 4 or the housing thereof is securely connected to a housing or the nozzle body 33 of the injector 5 or integrally formed therewith (not shown).

Preferably, the emulsifying device 4 is arranged within the pressure chamber 39 or the emulsifying device 4 is directly adjacent to the pressure chamber 39 or the emulsifying device 4 is arranged directly in front of the nozzle head 34 or the outlet channel 34B.

In particular, the emulsifying device 4 is arranged in the lower half of the injector 5, or in the half thereof facing toward the combustion chamber B.

However, constructive solutions are also possible in which the emulsifying device 4 is arranged in an inlet of the injector 5.

The emulsifying system 3, emulsifying device 4 and/or injector 5 preferably has or forms an emulsifying chamber or emulsifying region 45.

Preferably, the emulsifying device 4 and/or emulsifying chamber 45 is flowed through at least substantially axially and/or along the longitudinal axis A.

Preferably, the emulsifying device 4 and/or emulsifying chamber 45 is arranged closer to the outlet than to the fuel inlet 40, water inlet 41, and/or return passage 37D. Advantageously, the production of the water-fuel emulsion takes place immediately or shortly before the injection thereof into the associated combustion chamber B.

Very especially preferably, the smallest distance between the emulsifying device 4 and the outlet channel 34B or the axial end of the injector 5 facing the combustion chamber B is less than 200 mm or 150 mm, preferably less than 100 mm or 80 mm, and/or greater than 10 mm or 20 mm, preferably greater than 30 mm or 40 mm.

The emulsifying device 4 is preferably designed to supply water laterally or transversely to the main direction of flow of the fuel or transversely to the longitudinal axis A to the fuel, pressure chamber 39 and/or emulsifying chamber 45.

Especially preferably, the water inlet channel 43 leads transversely or laterally into the pressure chamber 39 and/or emulsifying chamber 45. Advantageously, a—preferably turbulent—mixture of water and fuel is thus already achieved upon delivery of the water.

Figure 3:
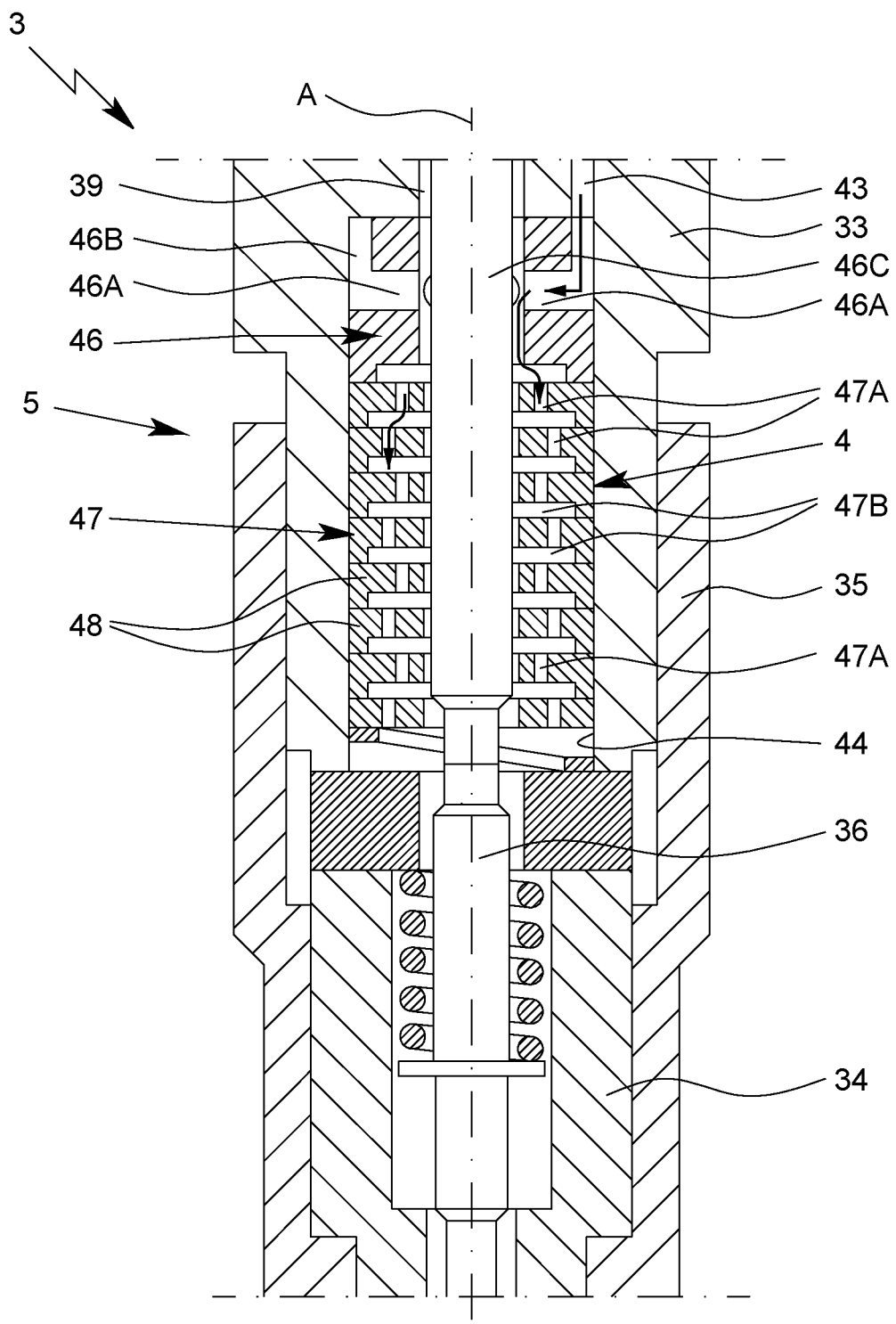
FIG. 3 shows a schematic section of the emulsifying system in the region of the emulsifying device according to FIG. 2.

FIG. 3 shows a schematic section of the emulsifying system 3 in the region of the emulsifying device 4.

The emulsifying device 4 is preferably static, rigid, or at least substantially immovable. In particular, the emulsifying device 4 has no moving elements or components. This enables a simple, stable, and compact construction to be achieved.

The emulsifying system 3 especially preferably has a preferably static mixer for mixing the fuel with water, and/or the emulsifying device 4 is embodied as a preferably static mixer for mixing the fuel with water.

The emulsifying device 4 preferably has a multi-stage, particularly two-stage design, and/or the emulsifying device 4 has a pre-emulsifying stage 46 and a fine emulsifying stage 47, the pre-emulsifying stage 46 and/or the fine emulsifying stage 47 preferably having or forming the emulsifying chamber 45.

Preferably, the pre-emulsifying stage 46 is designed to combine water and fuel.

In particular, the pre-emulsifying stage 46 is designed to supply water to the fuel laterally or at least substantially orthogonally to the main direction of flow of the fuel and/or to guide it into the pressure chamber 39 or emulsifying chamber 45.

In particular, the water inlet channel 43 opens into the pressure chamber 39 or emulsifying chamber 45 within the pre-emulsifying stage 46.

The emulsifying device 4, particularly the pre-emulsifying stage 46, preferably has at least one, more preferably a plurality of, supply channels or supply bores 46A, at least one preferably circumferential distribution channel or distribution chamber 46B, and/or an emulsifying compartment 46C.

Preferably, the supply channels 46A fluidly connect the pressure chamber 39, emulsifying chamber 45 and/or emulsifying compartment 46C to the water inlet channel 43 and/or water inlet 41.

The supply channels 46A are preferably distributed radially around the pressure chamber 39, emulsifying chamber 45 and/or the emulsifying compartment 46C, especially preferably in a common plane.

Most preferably, the supply channels 46A are aligned at least substantially orthogonally to the longitudinal axis A and/or designed to supply water laterally to the pressure chamber 39, emulsifying chamber 45 and/or emulsifying compartment 46C.

The distribution channel or distribution chamber 46B is preferably designed to fluidly connect the supply channels 46A to the water inlet channel 43 and/or to distribute water—at least substantially—uniformly via the supply channels 46A, preferably in such a way that water can be supplied from all sides to the pressure chamber 39, emulsifying chamber 45 and/or emulsifying compartment 46C via the supply channels 46A.

Preferably, the emulsifying compartment 46C is designed to mix or pre-emulsify fuel and water.

Especially preferably, the emulsifying compartment 46C is arranged in the emulsifying chamber 45 or forms same, or vice versa.

Figure 4:
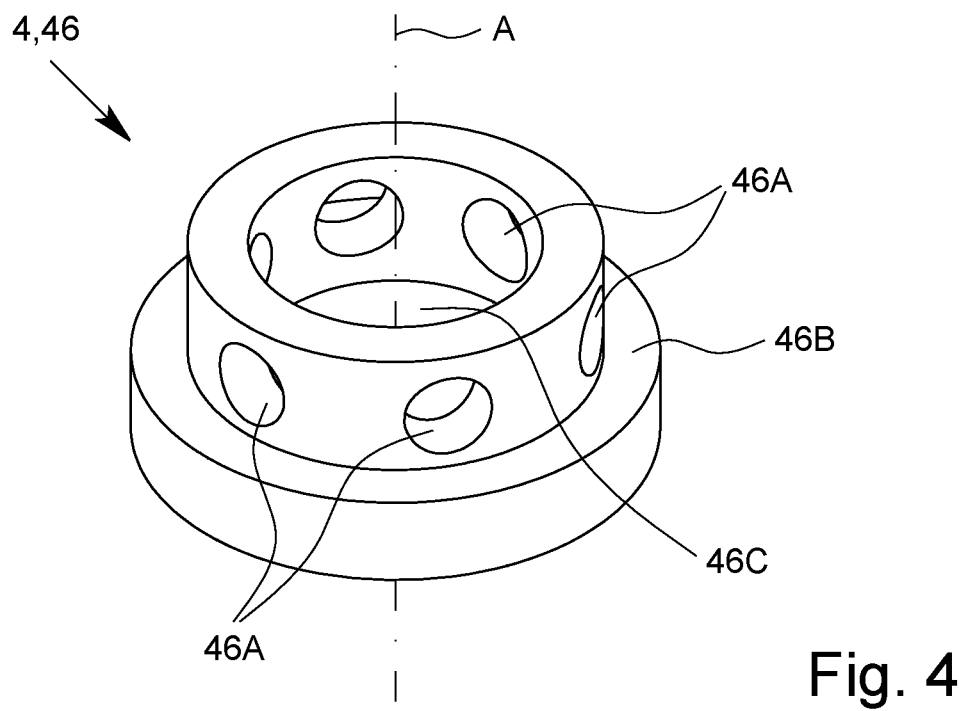
FIG. 4 shows a perspective view of the emulsifying device, or a pre-emulsifying stage thereof, according to FIG. 2.
Figure 5:
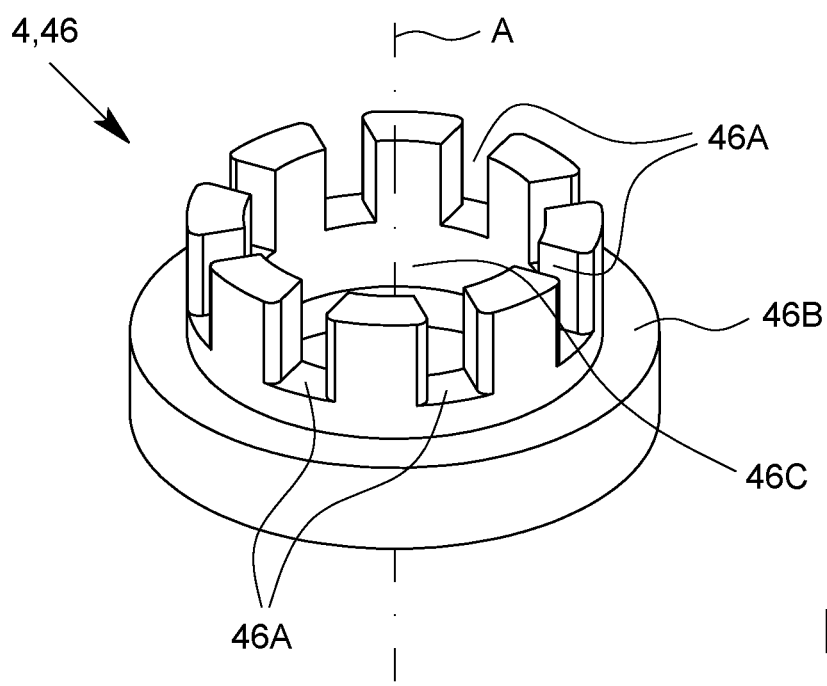
FIG. 5 shows a perspective view of a proposed emulsifying device, or a pre-emulsifying stage of a proposed emulsifying device, according to a further embodiment.

FIG. 4 shows a perspective view of the emulsifying device 4 or the pre-emulsifying stage 46 according to FIG. 3. FIG. 5 shows a perspective view of an alternative embodiment of the emulsifying device 4 or pre-emulsifying stage 46.

In the embodiment shown in FIG. 5, the supply channels 46B are preferably embodied as at least substantially rectangular openings, the supply channels 46A being particularly designed to be open axially or counter to the main direction of flow. The overall height of the emulsifying device 4 and/or pre-emulsifying stage 46 is thus advantageously reduced.

The fine emulsifying stage 47 is preferably arranged downstream from the pre-emulsifying stage 46, particularly from the emulsifying compartment 46C, preferably immediately.

The emulsifying device 4, particularly the fine emulsifying stage 47, preferably has at least one emulsifying channel 47A and/or at least one emulsifying compartment 47B.

The emulsifying channel 47A is preferably designed to fluidly connect the pressure chamber 39 and/or the pre-emulsifying stage 46, particularly the emulsifying compartment 46B, to the emulsifying compartment 47B, and/or to conduct water or fuel or the (pre-emulsified) water-fuel emulsion to the emulsifying compartment 47B and/or to the outlet channel 34B.

Preferably, the emulsifying compartment 47B is adjacent to the emulsifying channel 47A and/or the emulsifying compartment 47B is arranged downstream from the emulsifying channel 47A, or vice versa.

Preferably, the flow cross section of the emulsifying channel 47A is smaller than the flow cross section of the emulsifying compartment 47B.

In particular, the emulsifying channel 47A is designed to accelerate the flow and/or the water-fuel emulsion.

In particular, the emulsifying compartment 47B is designed to retard the flow and/or the water-fuel emulsion.

Most preferably, the emulsifying compartment 47B is designed to swirl water and fuel or the water-fuel emulsion and/or to increase the turbulence of the water-fuel emulsion. This advantageously enables the achievement of a particularly homogeneous water-fuel emulsion and/or a small average water droplet size in the fuel.

Preferably, the emulsifying device 4, particularly the fine emulsifying stage 47, has a plurality of emulsifying channels 47A and/or a plurality of emulsifying compartments 47B, preferably wherein the emulsifying compartments 47B are arranged one behind the other in the direction of flow and/or can be flowed through in succession and/or are fluidly interconnected via associated emulsifying channels 47A.

Most preferably, a plurality of emulsifying channels 47A are each assigned to an emulsifying compartment 47B and/or a plurality of emulsifying channels 47A are designed to conduct the water-fuel emulsion to an associated or downstream emulsifying compartment 47B.

Preferably, the distance of the emulsifying channels 47A to the longitudinal axis A varies along the longitudinal axis A or in the main direction of flow of the water-fuel emulsion.

Particularly, the emulsifying channels 47A that are arranged immediately downstream are offset laterally or radially relative to the longitudinal axis A in relation to the emulsifying channels 47A that are arranged immediately upstream, as is shown particularly in FIG. 3. This enables or supports particularly efficient mixing and/or swirling and thus, as a consequence thereof, mixing of fuel and water. However, constructive solutions are also possible in which the emulsifying channels 47A following one another in the main direction of flow are arranged coaxially with one another or have a common longitudinal axis.

Preferably, the emulsifying device 4 comprises at least one emulsifying element 48, the emulsifying element 48 preferably comprising or forming the emulsifying channel 47A and/or the emulsifying compartment 47B.

In the depicted embodiment, the emulsifying device 4 has a plurality of emulsifying elements 48, the emulsifying elements 48 being lined up axially or in the direction of flow. Other solutions are also possible here, however.

Preferably, the emulsifying elements 48 are plate-shaped or disc-shaped and/or loosely connected to one another.

In particular, the fine emulsifying stage 47 is formed by a plurality of, in this case eight, preferably at least substantially identically constructed emulsifying elements 48. However, constructive solutions are also possible in which the fine emulsifying stage 47 forms a structural unit or is embodied as a single piece.

Figure 6:
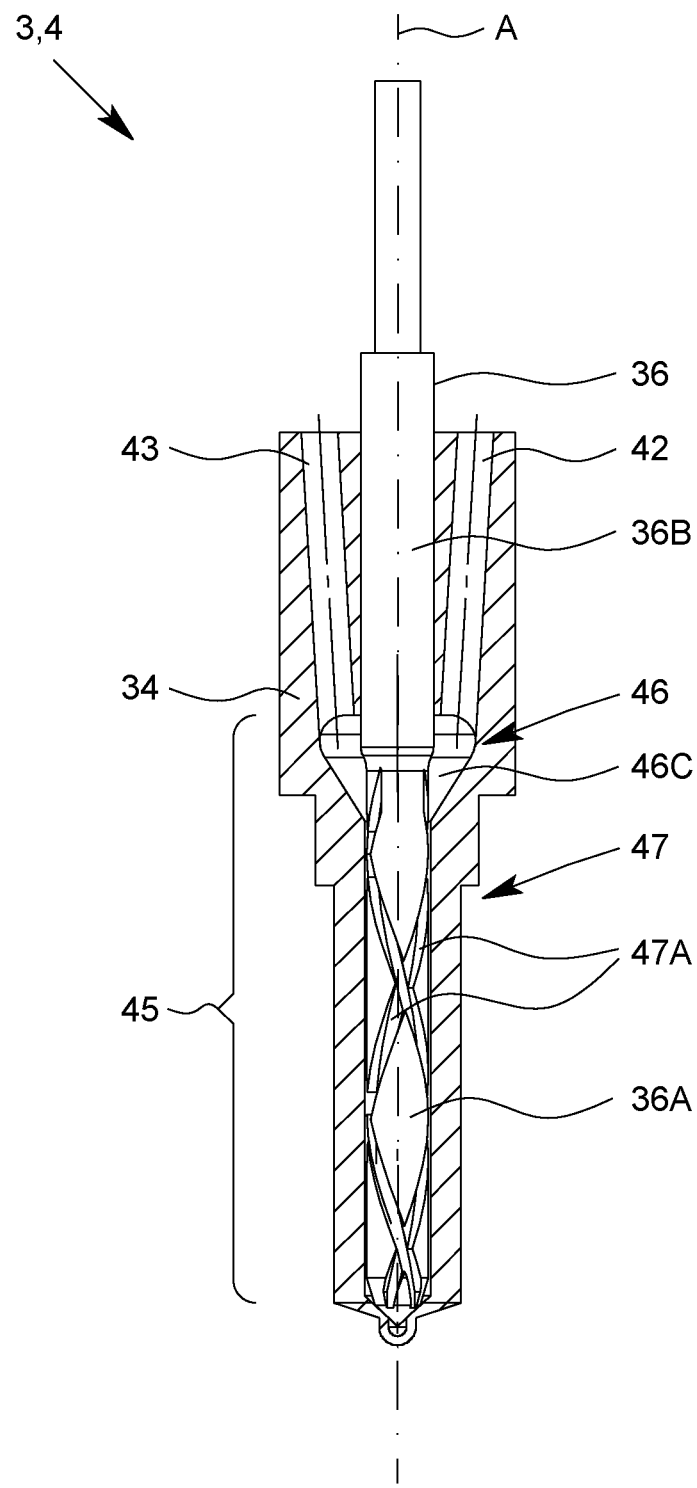
FIG. 6 shows a schematic section of a proposed emulsifying system in the vicinity of a proposed emulsifying device according to a further embodiment.

FIG. 6 shows the proposed emulsifying system 3 or the proposed emulsifying device 4 according to a further, especially preferred embodiment.

In the depicted embodiment, the emulsifying system 3 or emulsifying device 4 or pre-emulsifying stage 46 has a preferably annular emulsifying compartment 46C, with both the fuel inlet channel 42 and the water inlet channel 43 preferably leading to the emulsifying compartment 46C, preferably at least substantially axially, particularly at a distance from one another.

In the depicted embodiment, the fuel inlet channel 42 and the water inlet channel 43 are preferably inclined relative to the longitudinal axis A, preferably at an angle of greater than 1° or 5°, more preferably greater than 10° or 15°, and/or less than 90° or 60°, particularly less than 45° or 30°.

The emulsifying compartment 46C is preferably funnel-shaped. Especially preferably, the flow cross section of the emulsifying compartment 46C tapers downward or in the main direction of flow or toward the combustion chamber B (not shown in FIG. 6).

Preferably, the nozzle needle 36 extends—particularly at least substantially in the center—through the emulsifying chamber or region 45 or the emulsifying compartment 46C. In particular, the emulsifying compartment 46C is embodied as an annular space and/or the emulsifying compartment 46C surrounds the nozzle needle 36 in the manner of a ring.

In the embodiment illustrated in FIG. 6, the pre-emulsifying stage 46 and/or fine emulsifying stage 47 is/are preferably formed by the nozzle head 34 and/or the nozzle needle 36, particularly the nozzle needle tip 36A.

The injector 5, particularly the nozzle head 34 and/or the nozzle needle 36 or nozzle needle tip 36A, preferably has or forms the emulsifying channel 47A, particularly the fine emulsifying stage 47.

The emulsifying channel 47A is preferably designed to fluidly connect the pre-emulsifying stage 46, particularly the emulsifying compartment 46C of the pre-emulsifying stage 46, to the outlet channel 34B and/or to (further) emulsify the water-fuel emulsion, which was particularly pre-emulsified in the pre-emulsifying stage 46.

The emulsifying channel 47A is preferably formed by a recess or groove in the nozzle needle 36 and/or in the nozzle body 33 and/or nozzle head 34. In the depicted embodiment, the nozzle needle 36 and/or nozzle needle tip 36A has or forms the emulsifying channel 47A. However, constructive solutions are also possible in which the nozzle body 33 and/or the nozzle head 34 has or forms the emulsifying channel 47A, for example by means of a corresponding recess or groove on a side of the nozzle body 33 or nozzle head 34 facing the nozzle needle 36.

The emulsifying channel 47A preferably runs at least substantially axially and/or parallel to the longitudinal axis A.

In the depicted, especially preferred embodiment, the emulsifying channel 47A is helical and/or embodied as a helix or spiral around the nozzle needle 36 or longitudinal axis A.

Especially preferably, the emulsifying channel 47A winds around the nozzle needle 36 and/or nozzle needle tip 36A with a constant pitch. Preferably, the pitch of the emulsifying channel 47A relative to the longitudinal axis A or the angle formed in a side view of the injector 5 between the emulsifying channel 47A and the longitudinal axis A is greater than 5° or 10°, particularly greater than 15° or 20°, and/or less than 60° or 45°, particularly less than 30° or 25°.

Preferably, the emulsifying channel 47A winds at least once completely around the nozzle needle 36 or the longitudinal axis A.

The fine emulsifying stage 47, particularly the emulsifying channel 47A, is preferably designed to increase the turbulence in the water-fuel emulsion and/or to heighten the shear forces acting on the water-fuel emulsion and/or to produce an angular momentum on the flow or water-fuel emulsion.

In particular, the helical emulsifying channel 47A causes a swirling of the flow or of the water-fuel emulsion, particularly about the longitudinal axis A. This enables particularly good mixing of water and fuel while maintaining the compact construction of the emulsifying system 3.

Preferably, the emulsifying channel 47A has a flow cross section of less than 4 mm2 or 3 mm2 and/or greater than 1 mm2 or 1.5 mm2.

Preferably, the depth of the emulsifying channel 47A is greater than 0.1 mm or 0.3 mm, particularly greater than 0.5 mm, and/or less than 2 mm or 1.5 mm.

The injection system 2, emulsifying system 3 and/or emulsifying device 4, particularly the fine emulsifying stage 47, preferably has a plurality of emulsifying channels 47A as shown in FIGS. 6 and 7.

Preferably, the emulsifying channels 47A each have different slopes relative to the longitudinal axis A, or the emulsifying channels 47A each wind with a different pitch around the nozzle needle 36.

Especially preferably, the emulsifying channels 47A intersect at least once, preferably twice or three times, on the surface of the nozzle needle 36. Advantageously, the turbulence of the flow is thus increased, and/or particularly good mixing of water and fuel is achieved.

FIG. 8 shows the nozzle needle 36 according to a further or alternative embodiment Preferably, the nozzle needle 36, particularly the nozzle needle tip 36A, particularly in the region of the fine emulsifying stage 47 or in the region that is arranged in the emulsifying chamber 45, has—preferably circumferential—elevations and/or depressions, such as transverse grooves, the elevations and/or depressions preferably running transverse to the main direction of flow or longitudinal axis A. Advantageously, the turbulence, particularly in the emulsifying chamber 45 or in the pre-emulsifying stage 46 and/or fine emulsifying stage 47, is thus increased.

Figure 9:
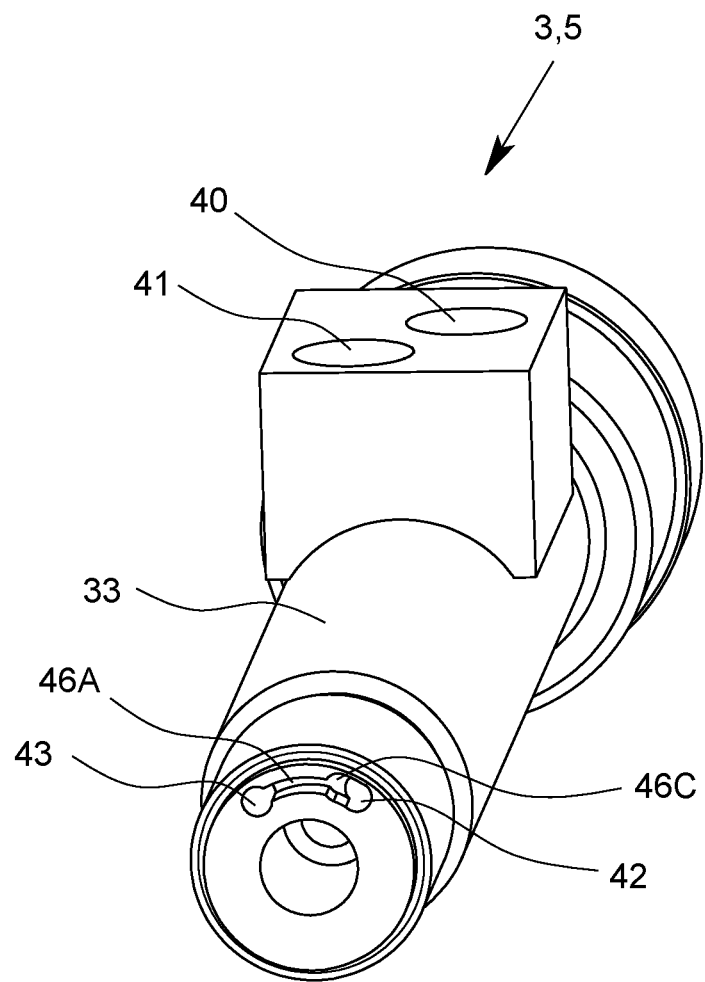
FIG. 9 shows a perspective view of a proposed emulsifying system according to a further embodiment.

FIG. 9 shows the emulsifying system 3 or the emulsifying device 4 or the injector 5 according to a further embodiment.

Preferably, the emulsifying device 4, particularly the pre-emulsifying stage 46, is formed at least partially by the nozzle body 33.

Preferably, the injector 5, particularly the nozzle body 33, has or forms the supply channel 46A and/or the emulsifying compartment 46C, preferably wherein the supply channel 46A fluidly connects the fuel inlet channel 42 to the water inlet channel 43, and/or water can flow via the supply channel 46A from the water inlet channel 43 into the fuel inlet channel 42 and/or the emulsifying compartment 46C.

Preferably, the emulsifying compartment 46C is adjacent to the fuel inlet channel 42, water inlet channel 43, and/or supply channel 46A, and/or the emulsifying compartment 46C is arranged immediately upstream from the fine emulsifying stage 47.

Especially preferably, the water inlet channel 43 is fluidly connected indirectly or via the supply channel 46A to the emulsifying compartment 46C, and the fuel inlet channel 42 is fluidly connected directly to the emulsifying compartment 46C.

In the installed state, the supply channel 46A preferably runs at least substantially horizontally and/or transversely to the longitudinal axis A.

In particular, the supply channel 46A is designed to conduct water and/or fuel laterally into the emulsifying compartment 46C. Other solutions are also possible here, however.

Preferably, the supply channel 46A and/or the emulsifying compartment 46C is/are arranged at the axial end of the nozzle body 33 or at the end of the nozzle body 33 facing toward the nozzle head 34. Other solutions are also possible here, however, as illustrated particularly in FIGS. 10 and 11.

Figure 10:
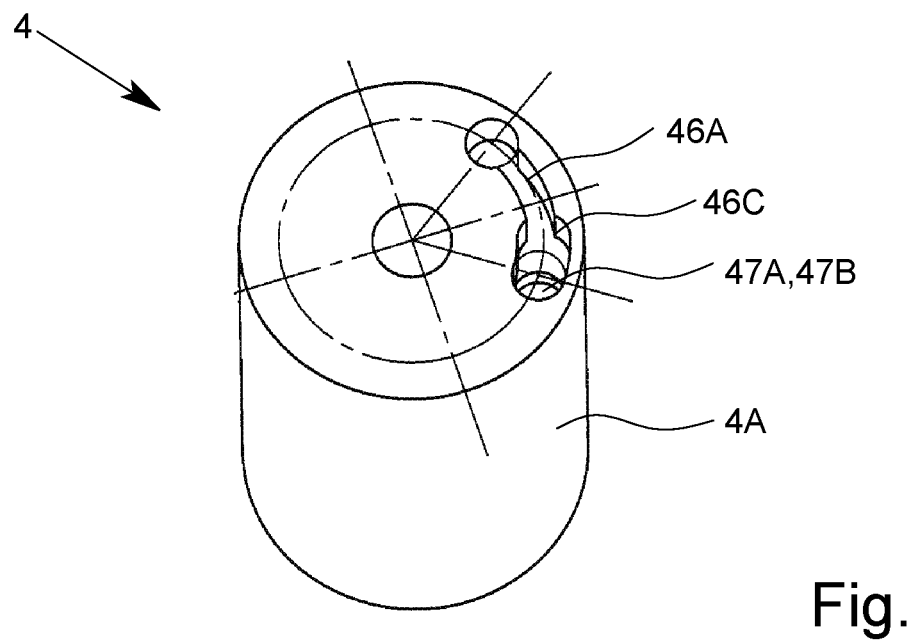
FIG. 10 shows a perspective view of a proposed emulsifying device according to a further embodiment.
Figure 11:
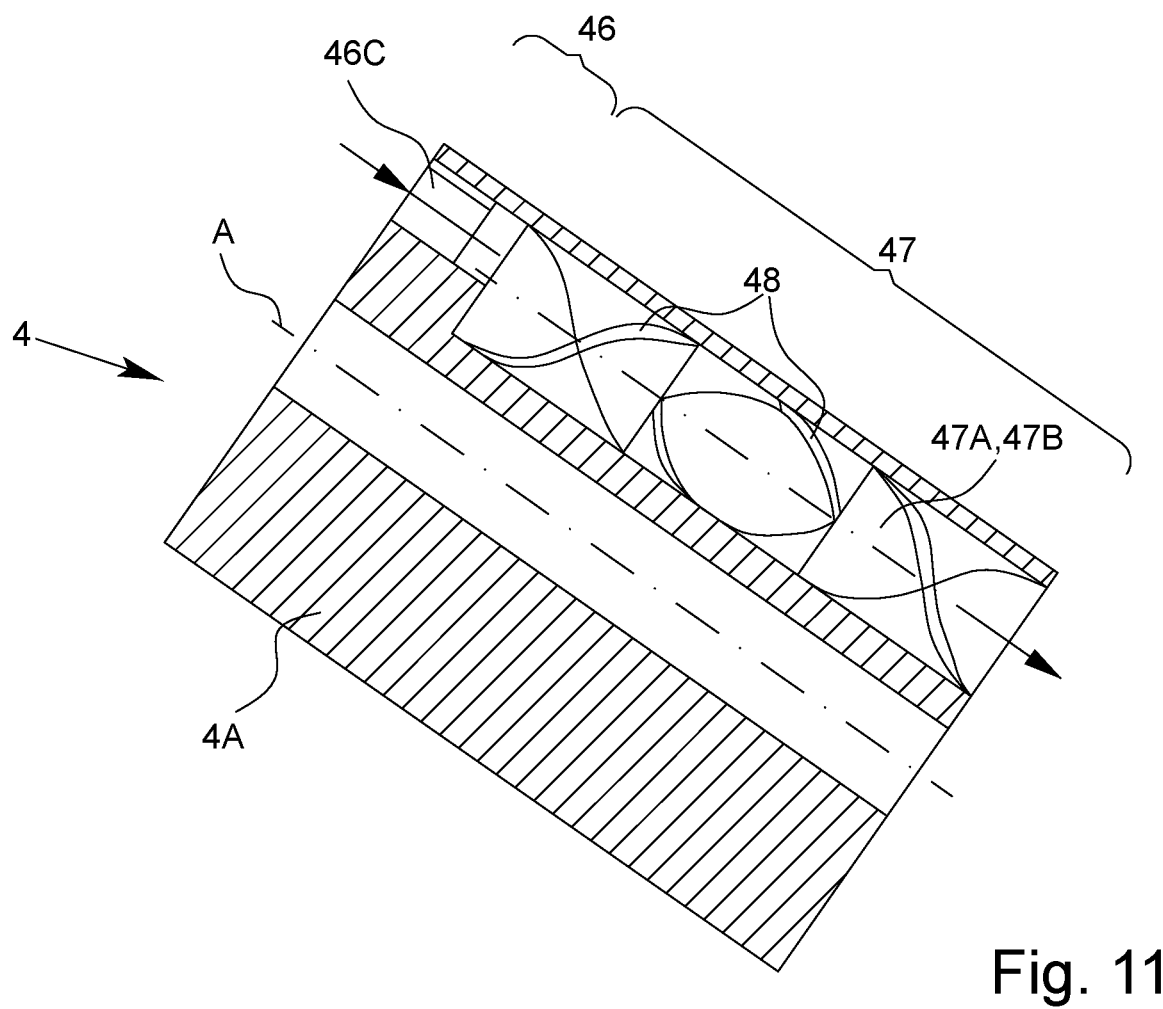
FIG. 11 shows a schematic section of the emulsifying device according to FIG. 10.

FIGS. 10 and 11 show the emulsifying device 4, particularly the pre-emulsifying stage 46 and fine emulsifying stage 47, according to another embodiment.

In the embodiment shown in FIGS. 10 and 11, the emulsifying device 4 is preferably embodied as a single piece or forms a structural unit. In particular, the pre-emulsifying stage 46 and fine emulsifying stage 47 are arranged in or integrated into a common base body 4A of the emulsifying device 4.

In the depicted embodiment, the emulsifying device 4 is preferably embodied as an intermediate member that is or can be arranged between the nozzle body 33 and the nozzle head 34 and/or is designed to connect the nozzle body 33 to the nozzle head 34.

The emulsifying device 4 preferably has the supply channel 46A and/or the emulsifying compartment 46C at an axial end and/or the end facing toward the nozzle body 33, and/or the emulsifying device 4 is designed to fluidly connect the fuel inlet channel 42 to the water inlet channel 43, preferably by means of the supply channel 46A and/or the emulsifying compartment 46C.

The fine emulsifying stage 47, particularly the emulsifying channel 47A and/or the emulsifying compartment 47B, preferably adjoins the emulsifying compartment 46C directly.

In the depicted embodiment, the fine emulsifying stage 47 is preferably formed by the emulsifying compartment 47B and at least one preferably insertable and/or exchangeable emulsifying element 48 that is preferably arranged in the emulsifying compartment 47B.

The emulsifying element 48 is especially preferably embodied as a preferably static mixer insert, for example as a metal mesh or wire mesh, particularly stainless steel.

The fine emulsifying stage 47, particularly the emulsifying channel 47A and/or the emulsifying compartment 47B, preferably extends at least substantially parallel and/or at a distance from the longitudinal axis A and/or the nozzle needle 36 (not shown in FIG. 11).

The fine emulsifying stage 47 preferably adjoins the nozzle head 34, and/or the water-fuel emulsion can be fed directly or immediately to the outlet channel 34B and/or the pressure chamber 39 by means of the fine emulsifying stage 47, particularly the emulsifying channel 47A and/or the emulsifying compartment 47B.

Preferably, the emulsifying device 4 can be clamped between the nozzle body 33 and the nozzle head 34 by means of the cap nut 35 (not shown in FIGS. 10 and 11). Advantageously, in such a way the proposed emulsifying device 4 can be added to an injector 5.

The proposed emulsifying method for producing a water-fuel emulsion will be explained in greater detail below.

The proposed emulsifying method is preferably carried out by means of the internal combustion engine 1, the injection system 2, the emulsifying system 3 and/or the emulsifying device 4.

The fuel is preferably taken from the fuel tank 8, preferably by means of the fuel precompression pump 9.

Preferably, the fuel is filtered in a fuel supply line 13, preferably by means of the fuel filter 10.

Preferably, the fuel is pressurized, preferably by means of the fuel precompression pump 9 and/or the high-pressure fuel pump 12, and fed to the (common) fuel pressure accumulator 6.

The fuel pressure K in the fuel pressure accumulator 6 and/or in the emulsifying system 4 or emulsifying device 4 is—at least at times or depending on the engine load—preferably greater than 50 MPa, 100 MPa or 150 MPa, more preferably greater than 180 MPa or 200 MPa, particularly greater than 220 MPa.

The water is preferably taken from the water tank 17, preferably by means of the water precompression pump 18.

Preferably, the water is filtered or purified, preferably by means of the water filter 19.

Preferably, the water is pressurized, preferably by means of the water precompression pump 18 and/or the high-pressure water pump 20, and fed to the water pressure accumulator 7.

The water pressure W in the water pressure accumulator 7 and/or in the emulsifying system 4 or emulsifying device 4 is preferably—at least at times or depending on the engine load—greater than 50 MPa, 100 MPa or 150 MPa, more preferably greater than 180 MPa or 200 MPa, particularly greater than 220 MPa.

Preferably, the fuel and the water are equally pressurized and/or the fuel pressure K immediately before the emulsifying system 3, emulsifying device 4 and/or in the fuel inlet 40 is equal to or (slightly) greater than the water pressure W immediately before the emulsifying system 3 emulsifying device 4 and/or in the water inlet 41.

In particular, the fuel pressure K in the fuel pressure accumulator 6 and/or the water pressure W in the water pressure accumulator 7 is/are feedback controlled or controlled, preferably by means of the first control unit 31 and/or second control unit 32, particularly by controlling the fuel precompression pump 9, the high-pressure fuel pump 12, the fuel pressure control valve 14, the water precompression pump 18, high-pressure water pump 20, the control valve 26A the water line 26, and/or the water pressure control valve 22.

Very especially preferably, the water pressure W is adapted to the fuel pressure K or the pressure difference between the water pressure W and the fuel pressure K and/or fluctuations in the pressure difference between the water pressure W and the fuel pressure K are compensated for or minimized, preferably by means of the second control unit 32 and/or by controlling the high-pressure water pump 20 and/or the water pressure control valve 22.

In an especially preferred embodiment, the water pressure W in the water pressure accumulator 7 is increased to a basic pressure level, the basic pressure level preferably being at least substantially constant and/or corresponding to the basic pressure level of the fuel pressure K in the fuel pressure accumulator 6.

Preferably, for each injection operation in which, in addition to the fuel, water is also to be supplied to the combustion chamber B, or in order to produce a water-fuel emulsion, a defined quantity or a defined volume of water is fed to the water pressure accumulator 7 and/or the water pressure W in the water pressure accumulator 7 is increased at least temporarily or for the respective injection operation, preferably in each case by the quantity or volume or pressure that is required in order to produce the water-fuel emulsion that is optimized for the present engine operating point and/or in order to adjust the water content in the water-fuel emulsion.

Preferably, the water supply to the water pressure accumulator 7 and/or injector 5 and/or emulsifying device 4, particularly the quantity or volume of water, the water pressure W, the timing and/or the duration of the water supply, is changed or adapted as a function of at least one operating parameter, particularly the engine load M, engine speed N, cooling-water temperature T, accelerator pedal position F, the fuel pressure K, and/or other operating parameters, preferably by means of the first control unit 31 and/or the second control unit 32 and/or through control of the water precompression pump 18, high-pressure water pump 20, the control valve 26A in the water line 26, and/or a water pressure control valve 22 on the water return line and/or in the water pressure accumulator 7.

The control valve 26A of the water line 26, particularly the time of opening, the opening duration, the time of closing and/or the closing duration of the control valve 26A, is especially preferably controlled or adapted to at least one operating parameter, preferably by means of the first control unit 31 and/or second control unit 32, particularly in order to adjust the water supply, such as the quantity or volume of water, the timing, and/or the duration of the water supply to the emulsifying device 4 and/or injector 5.

Preferably, after the pressurization of the water and fuel, the water and the fuel are fed to the emulsifying system 3, emulsifying device 4 and/or injector 5, preferably separately from one another, particularly via the fuel inlet 40 or water inlet 41.

Especially preferably, fuel is fed from the fuel pressure accumulator 6 via the fuel inlet 40 and water is fed from the water pressure accumulator 7 via the water inlet 41 to the emulsifying system 3, emulsifying device 4 and/or injector 5.

Alternatively, however, it is also possible for water and fuel to be fed together or collectively or via a common line to the emulsifying system 3 and/or emulsifying device 4.

Preferably, water and fuel are—first and/or exclusively—emulsified in the injector 5, and/or the water-fuel emulsion is—first and/or exclusively—produced and/or homogenized in the injector 5.

In particular, the fuel and water are mixed or emulsified within the injector 5 or by means of the emulsifying device 4 that is integrated into the injector 5.

Preferably, water is added to the fuel in the injector 5, particularly in order to (subsequently) supply water and fuel together as a mixture or water-fuel emulsion to the combustion chamber B, particularly via the outlet channel 34B.

Preferably, water is supplied laterally or transversely to the main direction of flow of the fuel in the injector 5 to the fuel, pressure chamber 39, emulsifying chamber 45 and/or emulsifying compartment 46C, preferably in a static mixer or in the pre-emulsifying stage 46 of the emulsifying device 4.

Preferably, the emulsifying device 4, particularly the fine emulsifying stage 47 and/or emulsifying channels 47A and/or emulsifying compartments 47B, is/are flowed through at least substantially axially by the—preferably pre-emulsified—water-fuel emulsion.

Preferably, the water-fuel emulsion is atomized or nebulized and/or emulsified in the injector 5 such that the average water droplet size is less than 1 μm.

Preferably, the water-fuel emulsion is fed by means of the injector 5 to an associated cylinder or injected into an associated combustion chamber B, preferably via one or more preferably common outlet channels 34B.

The reaction time or the time for adapting the emulsion composition or the water fraction in the water-fuel emulsion to changed operating conditions is preferably less than 1000 ms or 800 ms, more preferably less than 700 ms or 600 ms, particularly less than 400 ms or 300 ms, and/or greater than 10 ms or 50 ms, more preferably greater than 80 ms or 100 ms.

Optionally, the emulsifying system 3, particularly the emulsifying device 4 and/or the injector 5, is flushed with (pure) fuel—at least partially and/or as needed.

Particularly, the water line 26, the water inlet 41, and/or the water inlet channel 43 is/are at least partially flushed with fuel, particularly before, during, and/or after the internal combustion engine 1 is shut off, preferably by opening the control valve 27A in the control line 27, particularly by means of the first control unit 31 and/or second control unit 32. Advantageously, the risk of corrosion of the emulsifying system 3, the emulsifying device 4, and/or the injector 5, particularly the water line 26, the water inlet 41, and/or the water inlet channel 43, is thus prevented or reduced.

Preferably, the flushed-out water or the flushed-out water-fuel emulsion is reused and/or fed to the return line 28 and/or water separator 28A.

Preferably, the flushing of the emulsifying device 4 or injector 5 with fuel and/or the removal of residues of the water-fuel emulsion in the emulsifying device 4 and/or injector 5 is performed in less than 3 s or 2 s, especially preferably less than 1.5 s or 1 s, and/or within fewer than 20 work cycles or 10 work cycles, especially preferably fewer than 8 work cycles, of the internal combustion engine 1 at an idling speed of less than 1000 rpm or 900 rpm and/or greater than 500 rpm or 600 rpm.

Individual aspects and features of the present invention as well as individual method steps can be implemented independently of each other or also in any combination and/or sequence.

List of reference symbols:

| | |
|---|---|
| 1 | combustion engine |
| 2 | injection system |
| 3 | emulsifying system |
| 4 | emulsifying device |
| 4A | base body |
| 5 | injector |
| 6 | fuel pressure accumulator |
| 7 | water pressure accumulator |
| 8 | fuel tank |
| 9 | fuel precompression pump |
| 10 | fuel filter |
| 11 | fuel meter |
| 12 | high-pressure fuel pump |
| 13 | fuel supply line |

-continued

List of reference symbols:

| | |
|---|---|
| 14 | fuel pressure control valve |
| 15 | fuel return line |
| 16 | fuel meter |
| 17 | water tank |
| 18 | water precompression pump |
| 19 | water filter |
| 20 | high-pressure water pump |
| 21 | water supply line |
| 22 | water pressure control valve |
| 23 | exhaust pipe |
| 24 | recovery system |
| 24A | throttle |
| 24B | radiator |
| 24C | pressure sensor |
| 24D | humidity sensor |
| 24E | treatment unit |
| 25 | fuel line |
| 25A | control valve |
| 25B | check valve |
| 26 | water line |
| 26A | control valve |
| 26B | check valve |
| 27 | flush line |
| 27A | control valve |
| 28 | return line |
| 28A | water separator |
| 29 | fuel pressure sensor |
| 30 | water pressure sensor |
| 31 | first control unit |
| 32 | second control unit |
| 33 | valve body/nozzle body |
| 34 | valve head/nozzle head |
| 34A | valve seat |
| 34B | outlet channel |
| 35 | cap nut |
| 36 | nozzle needle |
| 36A | nozzle needle tip |
| 36B | middle part |
| 36C | control piston |
| 37 | control device |
| 37A | electromagnet |
| 37B | armature |
| 37C | control valve |
| 37D | return passage connecting piece |
| 38 | control channel |
| 39 | pressure chamber |
| 40 | fuel inlet |
| 41 | water inlet |
| 42 | fuel inlet channel |
| 43 | water inlet channel |
| 44 | receptacle |
| 45 | emulsifying chamber |
| 46 | pre-emulsifying stage |
| 46A | supply channel |
| 46B | distribution channel |
| 46C | emulsifying compartment |
| 47 | fine emulsifying stage |
| 47A | emulsifying channel |
| 47B | emulsifying compartment |
| 48 | emulsifying element |
| A | longitudinal axis |
| B | combustion chamber |
| F | accelerator pedal position |
| K | fuel pressure |
| M | engine load |
| N | engine speed |
| T | cooling-water temperature |
| W | water pressure |

The invention claimed is:

1. An emulsifying system configured for an internal combustion engine, wherein the emulsifying system comprises an emulsifying device configured to produce a water-fuel emulsion, and an injector or injection nozzle configured to inject the water-fuel emulsion into a combustion chamber, wherein the emulsifying device is integrated into the injector or injection nozzle, and wherein the injector or injection nozzle comprises a nozzle needle and the emulsifying system comprises at least one emulsifying channel extending helically about the longitudinal axis of the nozzle needle.

2. The emulsifying system according to claim 1, wherein the emulsifying system has a fuel inlet and a water inlet that is separate from the fuel inlet.

3. The emulsifying system according to claim 1, wherein the injector or injection nozzle has or forms a pressure chamber.

4. The emulsifying system according to claim 3, wherein the emulsifying device is at least one of arranged in the pressure chamber and fluidly connected to the pressure chamber.

5. The emulsifying system according to claim 1, wherein the nozzle needle extends through the emulsifying device.

6. The emulsifying system according to claim 1, wherein the nozzle needle is arranged at least one of laterally next to the emulsifying device and at a distance from the emulsifying device.

7. The emulsifying system according to claim 1, wherein the emulsifying device has a multi-stage construction.

8. The emulsifying system according to claim 1, wherein the emulsifying device has a pre-emulsifying stage and a fine emulsifying stage.

9. The emulsifying system according to claim 1, wherein the emulsifying system has or forms a mixer configured to mix the fuel with water.

10. The emulsifying system according to claim 9, wherein the mixer forms or has at least one of a pre-emulsifying stage and a fine emulsifying stage of the emulsifying device.

11. The emulsifying system according to claim 9, wherein the emulsifying device is designed to feed the water to the fuel.

12. The emulsifying system according to claim 1, wherein the emulsifying channel is deepened into the nozzle needle.

13. The emulsifying system according to claim 1, wherein the emulsifying system has a plurality of emulsifying channels that extend helically about the longitudinal axis of the nozzle needle.

14. The emulsifying system according to claim 13, wherein the emulsifying channels intersect at least once.

15. The emulsifying system according to claim 1, wherein the injector or injection nozzle has at least one outlet channel for the water-fuel emulsion.

16. The emulsifying system according to claim 15, wherein the emulsifying device is arranged closer to the outlet channel than to at least one of a fuel inlet, a water inlet, and an end of the injector or injection nozzle opposite the outlet channel.

17. An injection system configured for an internal combustion engine, wherein the injection system includes a plurality of emulsifying systems configured to produce a water-fuel emulsion, a fuel pressure accumulator, and a water pressure accumulator, wherein the fuel pressure accumulator and water pressure accumulator are fluidly connected to all emulsifying systems, wherein each emulsifying system comprises an emulsifying device configured to produce a water-fuel emulsion, and an injector or injection nozzle configured to inject the water-fuel emulsion into an associated combustion chamber, with the emulsifying device being integrated into the injector or injection nozzle, and wherein each injector or injection nozzle comprises a nozzle needle and each emulsifying system comprises at least one emulsifying channel extending, helically about the longitudinal axis of the nozzle needle.

18. An emulsifying method for producing a water-fuel emulsion for an internal combustion engine, the method comprising:

emulsifying fuel and water by an emulsifying device that is integrated into an injector or injection nozzle, the injector or injection nozzle being designed to inject the water-fuel emulsion into an associated combustion chamber, wherein a swirl is generated in at least one of the flow of the water and the fuel by means of at least one helical emulsifying channel around a nozzle needle of the injector or injection nozzle.

19. The emulsifying method according to claim 18, wherein the water is fed to the fuel radially or transversely to the main direction of flow of the fuel in the injector or injection nozzle.

20. The emulsifying method according to claim 18, wherein the water-fuel emulsion is caused to swirl.

21. The emulsifying method according to claim 18, wherein the method further comprises at least one of: pressurizing the water in a water pressure accumulator and supplying a defined quantity or a defined volume of said pressurized water for each injection operation or immediately before each injection operation, and increasing at least temporarily the water pressure in the water pressure accumulator.

22. The emulsifying method according to claim 21, wherein at least one of the quantity or the volume of the supplied pressurized water and the water pressure in the water pressure accumulator is changed or adjusted as a function of at least one operating parameter.

23. The emulsifying method according to claim 18, wherein the method further comprises a step of controlling at least one of: a water supplied to a water pressure accumulator, the water supplied to the emulsifying device, the water supplied to the injector, and the water pressure in the water pressure accumulator.

* * * * *